United States Patent
Ishida

(10) Patent No.: US 9,128,807 B2
(45) Date of Patent: Sep. 8, 2015

(54) MODULE STRUCTURAL ANALYSIS SUPPORTING DEVICE AND PROGRAM

(75) Inventor: Shinichi Ishida, Odawara (JP)

(73) Assignees: Shinichi Ishida, Odawara-shi, Kanagawa (JP); Tsutomu Matsuzaki, Tokyo (JP); I-SYSTEM CO., LTD., Tokyo (JP)

(*) Notice: Subject to any disclaimer, the term of this patent is extended or adjusted under 35 U.S.C. 154(b) by 59 days.

(21) Appl. No.: 14/235,040

(22) PCT Filed: Jul. 10, 2012

(86) PCT No.: PCT/JP2012/067577
§ 371 (c)(1),
(2), (4) Date: Jan. 24, 2014

(87) PCT Pub. No.: WO2013/015109
PCT Pub. Date: Jan. 31, 2013

(65) Prior Publication Data
US 2014/0196009 A1    Jul. 10, 2014

(30) Foreign Application Priority Data
Jul. 25, 2011  (JP) .................................. 2011-162519

(51) Int. Cl.
*G06F 9/44*    (2006.01)
*G06F 13/10*   (2006.01)
(Continued)

(52) U.S. Cl.
CPC ... *G06F 8/75* (2013.01); *G06F 8/51* (2013.01)

(58) Field of Classification Search
CPC ............ G06F 11/3476; G06F 11/3608; G06F 11/3676; G06F 11/3696; G06F 11/3612; G06F 17/30569; G06F 17/5009; G06F 8/31; G06F 8/35; G06F 8/51; G06F 8/74
See application file for complete search history.

(56) References Cited

U.S. PATENT DOCUMENTS 5,390,320 A * 2/1995 Smithline ...................... 703/20
5,751,288 A   5/1998 Oshima
(Continued)

FOREIGN PATENT DOCUMENTS

| JP | 01-286026 A | 11/1989 |
| JP | 02-140828 A | 5/1990 |

(Continued)

OTHER PUBLICATIONS

Japanese Office Action dated May 9, 2013 (and English translation thereof) issued in counterpart Japanese Application No. 2011-162519.

(Continued)

*Primary Examiner* — Don Wong
*Assistant Examiner* — Anibal Rivera
(74) *Attorney, Agent, or Firm* — Holtz, Holtz, Goodman & Chick PC

(57) ABSTRACT

A device supporting the structural analysis of a module comprises: a storage means storing at least one module; and a conversion means that converts a prescribed target module among the modules stored by the storage means to a secondary module and stores same in the storage means. The conversion means reads the target module from the storage means and sequentially outputs to the secondary module each sentence written from a prescribed processing start location in the target module to a prescribed processing end location. The conversion means also recursively develops a sentence written in processing units etc., for execution, and outputs same to the secondary module, when the sentence is a module internal processing unit or a sentence that executes another module.

12 Claims, 19 Drawing Sheets

(51) Int. Cl.
  *G06F 13/12* (2006.01)
  *G06F 9/45* (2006.01)

(56) References Cited

U.S. PATENT DOCUMENTS

| | | | |
|---|---|---|---|
| 5,923,881 A | 7/1999 | Fujii et al. | |
| 5,960,433 A | 9/1999 | Fujii et al. | |
| 6,173,443 B1* | 1/2001 | Wakatani | 717/160 |
| 7,424,646 B2* | 9/2008 | Smith | 717/128 |
| 7,568,189 B2* | 7/2009 | Suba et al. | 717/145 |
| 2006/0253840 A1* | 11/2006 | Cruickshank et al. | 717/127 |
| 2008/0022262 A1* | 1/2008 | Prakash et al. | 717/124 |
| 2008/0052670 A1* | 2/2008 | Espinosa et al. | 717/113 |
| 2009/0138843 A1* | 5/2009 | Hinton et al. | 717/101 |
| 2009/0292791 A1* | 11/2009 | Livshits et al. | 717/106 |
| 2010/0042974 A1* | 2/2010 | Gutz et al. | 717/121 |
| 2010/0095274 A1* | 4/2010 | Sadowsky | 717/124 |
| 2010/0175052 A1* | 7/2010 | Prasad et al. | 717/128 |

FOREIGN PATENT DOCUMENTS

| | | |
|---|---|---|
| JP | 03-292532 A | 12/1991 |
| JP | 04-127235 A | 4/1992 |
| JP | 04-165425 A | 6/1992 |
| JP | 07-261990 A | 10/1995 |
| JP | 07-281883 A | 10/1995 |
| JP | 08-095763 A | 4/1996 |
| JP | 09-282150 A | 10/1997 |
| JP | 10-320190 A | 12/1998 |
| JP | 11-110198 A | 4/1999 |
| JP | 11-272503 A | 10/1999 |
| JP | 2001-154835 A | 6/2001 |
| JP | 2006-209521 A | 8/2006 |
| JP | 2008-181311 A | 8/2008 |
| JP | 2009-086922 A | 4/2009 |

OTHER PUBLICATIONS

"Development Assistant for C 4.0", C Magazine, Japan, Softbank Creative Corp., Dec. 1, 2005, vol. 17, No. 12, pp. 86-91.

International Search Report (ISR) dated Aug. 7, 2012 (and English translation thereof) issued in International Application No. PCT/JP2012/067577.

* cited by examiner

| LINE # | 1 | 2 | 3 | 4 | 5 |
|---|---|---|---|---|---|
| 33 | 002100 MAIN-E. | | | | |
| 34 | 002200 GOBACK. | | | | |
| 40 | 007100 PGMAAAP-PROG-999. | | | | |
| 41 | 007200 EXIT. | | | | |
| 42 | 002700p* | | | | |
| 43 | 002800*#E | EVALUATE WK-A-O | | | |
| 44 | 002900*#E | WHEN CS-1 | | | |
| 45 | W00001 | IF (WK-A-0 = CS-1) | | | |
| 46 | W00002 | THEN | | | |
| 47 | 003000 CS-1 B-I | MOVE TO WK- | | | |
| | | 003100*#E | WHEN CS-2 | | |
| | | W00004 | IF (WK-A-0 = CS-2) | | |
| | | W00005 | THEN | | |
| | | 003200 CS-2 B-I | MOVE TO WK- | | |
| | | | 003300*#E | WHEN CS-3 | |
| | | W00006 | ELSE | | |
| | | | W00007 | IF (WK-A-0 = CS-3) | |
| | | | W00008 | THEN | |
| | | | 003400 CS-3 B-I | MOVE TO WK- | |
| | | | | 003500*#E | WHEN CS-4 |
| | | | W00009 | ELSE | |
| | | | | W00010 | IF (WK-A-0 = CS-4) |
| | | | | W00011 | THEN |
| | | | | 003600 CS-4 B-I | MOVE TO WK- |
| | | | | | 003700*#E OTHER |
| | | | | | 003800 TO WK-B-I |
| | | | | | 003900*#E EVALUATE. |
| | | | | W00012 | ELSE |
| | | | | W00013 | END-IF |
| | | | W00014 | END-IF | |
| | | W00015 | END-IF | | |
| 70 | W00016 | END-IF | | | |
| 71 | 004000 | | | | |

ROW → COLUMN

33

1ST TO 8TH COLUMN →

| LINE # | SEQUENCE NUMBER | SECONDARY SENTENCE | MATRIX OF EXECUTION IN EACH TEST CASE ||||| 
|---|---|---|---|---|---|---|---|
| | | | C1 | C2 | C3 | C4 | C5 |
| 1 | 002400 | MAIN-S. | * | * | * | * | * |
| 2 | 002500 | * | * | * | * | * | * |
| 3 | 002600 | *#P PERFORM PGMAAAP-PROC. | * | * | * | * | * |
| 4 | 006400 | ************************************** | * | * | * | * | * |
| 5 | 006500 | *G    CALL AAA PROGRAM | * | * | * | * | * |
| 6 | 006600 | *G | * | * | * | * | * |
| 7 | 006700 | ************************************** | * | * | * | * | * |
| 8 | 006800 | PGMAAAP-PROC.              SECTION. | * | * | * | * | * |
| 9 | 006900 | PGMAAAP-SECTION-010. | * | * | * | * | * |
| 10 | 007000 | *#C   CALL 'AAA' USING WK-A-I WK-A-O. | * | * | * | * | * |
| 11 | 001500 | MAIN-S. | * | * | * | * | * |
| 12 | 001600 | * | * | * | * | * | * |
| 13 | 001700 |     MOVE WK-A-I  TO WK-C-I. | O | O | O | O | O |
| 14 | 001800 | *#C  CALL 'CCC' USING WK-C-I WK-C-O. | * | * | * | * | * |
| 15 | 001200 | MAIN-S. | * | * | * | * | * |
| 16 | 001300 | * | * | * | * | * | * |
| 17 | 001400 |     IF WK-C-I = 1 | I | I | I | - | - |
| 18 | 001500 |       THEN | T | - | - | - | - |
| 19 | 001600 |         MOVE 1 TO WK-C-O | O | - | - | - | - |
| 20 | 001700 |       ELSE | - | E | E | - | - |
| 21 | 001800 |         IF WK-C-I = 2 | - | I | I | - | - |
| 22 | 001900 |           THEN | - | T | - | - | - |
| 23 | 002000 |             COMPUTE WK-C = WK-C-I * 10 | - | O | - | - | - |
| 24 | 002100 |             MOVE WK-C TO WK-C-O | - | O | - | - | - |
| 25 | 002200 |           ELSE | - | - | E | - | - |
| 26 | 002300 |             MOVE 9 TO WK-C-I | - | - | O | - | - |
| 27 | 002400 | *#O          COMPUTE WK-C = | - | - | * | - | - |
| 28 | 002500 | *#O                 WK-C-I * 5 - 5 | - | - | * | - | - |
| 29 | T00000 |             COMPUTE WK-C = WK-C-I * 5 - 5 | - | - | O | - | - |
| 30 | 002600 |             MOVE WK-C TO WK-C-O | - | - | O | - | - |
| 31 | 002700 |         END-IF | - | EI | EI | - | - |
| 32 | 002800 |     END-IF. | EI | EI | EI | - | - |
| 33 | 002900 | * | * | * | * | * | * |
| 34 | 003000 | MAIN-E. | * | * | * | * | * |
| 35 | 003100 |     GOBACK. | O | O | O | O | O |
| 36 | 001900 |     MOVE WK-C-O  TO WK-A-O. | O | O | O | O | O |
| 37 | 002000 | * | * | * | * | * | * |
| 38 | 002100 | MAIN-E. | * | * | * | * | * |
| 39 | 002200 |     GOBACK. | O | O | O | O | O |
| 40 | 007100 | PGMAAAP-PROC-999. | * | * | * | * | * |
| 41 | 007200 |     EXIT. | O | O | O | O | O |
| 42 | 002700 | * | * | * | * | * | * |
| 43 | 002800 | *#E   EVALUATE WK-A-O | * | * | * | * | * |
| 44 | 002900 | *#E     WHEN CS-1 | * | * | * | * | * |
| 45 | W00001 |       IF ( WK-A-O = CS-1 ) | I | I | I | I | I |
| 46 | W00002 |       THEN | T | - | - | - | - |
| 47 | 003000 |         MOVE CS-1 TO WK-B-I | O | - | - | - | - |
| 48 | W00003 |       ELSE | - | E | E | E | E |
| 49 | 003100 | *#E     WHEN CS-2 | * | * | * | * | * |
| 50 | W00004 |       IF ( WK-A-O = CS-2 ) | - | I | I | I | I |
| 51 | W00005 |       THEN | - | T | - | - | - |
| 52 | 003200 |         MOVE CS-2 TO WK-B-I | - | O | - | - | - |
| 53 | W00006 |       ELSE | - | - | E | E | E |
| 54 | 003300 | *#E     WHEN CS-3 | - | - | * | * | * |
| 55 | W00007 |       IF ( WK-A-O = CS-3 ) | - | - | I | I | I |
| 56 | W00008 |       THEN | - | - | T | - | - |
| 57 | 003400 |         MOVE CS-3 TO WK-B-I | - | - | O | - | - |
| 58 | W00009 |       ELSE | - | - | - | E | E |
| 59 | 003500 | *#E     WHEN CS-4 | - | - | - | * | * |
| 60 | W00010 |       IF ( WK-A-O = CS-4 ) | - | - | - | I | I |
| 61 | W00011 |       THEN | - | - | - | T | - |
| 62 | 003600 |         MOVE CS-4 TO WK-B-I | - | - | - | O | - |
| 63 | W00012 |       ELSE | - | - | - | - | E |
| 64 | 003700 | *#E     WHEN OTHER | - | - | - | - | * |
| 65 | 003800 |         MOVE 9 TO WK-B-I | - | - | - | - | O |
| 66 | 003900 | *#E   END-EVALUATE. | - | - | - | - | - |
| 67 | W00013 |       END-IF | - | - | - | EI | EI |
| 68 | W00014 |       END-IF | - | - | EI | EI | EI |
| 69 | W00015 |       END-IF | - | EI | EI | EI | EI |
| 70 | W00016 |       END-IF | EI | EI | EI | EI | EI |

FIG. 7

1ST TO 183TH COLUMN

| LINE # | SEQUENCE NUMBER | SECONDARY SENTENCE | C1 | C2 | C3 | C4 | C5 | C178 | C179 | C180 |
|---|---|---|---|---|---|---|---|---|---|---|
| 11 | 001500 | MAIN-S. | * | * | * | * | * | * | * | * |
| 12 | 001600 | * | * | * | * | * | * | * | * | * |
| 13 | 001700 | MOVE WK-A-I TO WK-C-I. | O | O | O | O | O | O | O | O |
| 14 | 001800 | *#C CALL 'CCC' USING WK-C-I WK-C-O. | * | * | * | * | * | * | * | * |
| 15 | 001200 | MAIN-S. | * | * | * | * | * | * | * | * |
| 16 | 001300 | * | * | * | * | * | * | * | * | * |
| 17 | 001400 | IF WK-C-I = 1 | I | I | I | I | I | I | I | I |
| 18 | 001500 | THEN | T | – | – | T | – | T | – | – |
| 19 | 001600 | MOVE 1 TO WK-C-O | O | – | – | O | – | O | – | – |
| 20 | 001700 | ELSE | – | E | E | – | E | – | E | E |
| 21 | 001800 | IF WK-C-I = 2 | – | I | I | – | I | – | I | I |
| 22 | 001900 | THEN | – | T | – | – | T | – | T | – |
| 23 | 002000 | COMPUTE WK-C = WK-C-I * 10 | – | O | – | – | O | – | O | – |
| 24 | 002100 | MOVE WK-C TO WK-C-O | – | O | – | – | O | – | O | – |
| 25 | 002200 | ELSE | – | – | E | – | – | – | – | E |
| 26 | 002300 | MOVE 9 TO WK-C-I | – | – | O | – | – | – | – | O |
| 27 | 002400 | *O COMPUTE WK-C = | – | – | * | – | – | – | – | * |
| 28 | 002500 | *O WK-C-I * 5 - 5 | – | – | * | – | – | – | – | * |
| 29 | T00000 | COMPUTE WK-C = WK-C-I * 5 - 5 | – | – | O | – | – | – | – | O |
| 30 | 002600 | MOVE WK-C TO WK-C-O | – | – | O | – | – | – | – | O |
| 31 | 002700 | END-IF | – | EI | EI | – | EI | – | EI | EI |
| 32 | 002800 | END-IF. | EI | EI | EI | EI | EI | EI | EI | EI |
| 33 | 002900 | * | * | * | * | * | * | * | * | * |
| 34 | 003000 | MAIN-E. | * | * | * | * | * | * | * | * |
| 35 | 003100 | GOBACK. | O | O | O | O | O | O | O | O |
| 36 | 001900 | MOVE WK-C-O TO WK-A-O. | O | O | O | O | O | O | O | O |
| 37 | 002000 | * | * | * | * | * | * | * | * | * |
| 38 | 002100 | MAIN-E. | * | * | * | * | * | * | * | * |
| 39 | 002200 | GOBACK. | O | O | O | O | O | O | O | O |
| 40 | 007100 | PGMAAAP-PROC-999. | * | * | * | * | * | * | * | * |
| 41 | 007200 | EXIT. | O | O | O | O | O | O | O | O |
| 42 | 002700 | * | * | * | * | * | * | * | * | * |
| 43 | 002800 | *#E EVALUATE WK-A-O | * | * | * | * | * | * | * | * |
| 44 | 002900 | *#E WHEN CS-1 | * | * | * | * | * | * | * | * |
| 45 | W00001 | IF ( WK-A-O = CS-1 ) | I | I | I | I | I | I | I | I |
| 46 | W00002 | THEN | T | T | T | – | – | – | – | – |
| 47 | 003000 | MOVE CS-1 TO WK-B-I | O | O | O | – | – | – | – | – |
| 48 | W00003 | ELSE | – | – | – | E | E | E | E | E |

ROW

FIG. 15

MODULE : CCC  [BEFORE MAINTENANCE]

DIFFERENCE BETWEEN MODULE CCC BEFORE MAINTENANCE
AND MODULE CCC AFTER MAINTENANCE

COMPARE

| CCC 001800 | IF WK-C-I = 2 OR | 20110704 |
| CCC 001850 | WK-C-I = 4 | 20110704 |
| CCC 002400* | COMPUTE WK-C = | 20110704 |
| CCC 002500* | WK-C-I * 5 - 5 | 20110704 |
| CCC 002550 | COMPUTE WK-C = WK-C-I * (1 + 10%) | 20110704 |

MODULE : CCC  [AFTER MAINTENANCE]

```
000100***************************************
000200> CCC : CALLED FROM AAA.
000300***************************************
000400 IDENTIFICATION      DIVISION.
000500 PROGRAM-ID.         CCC.
000600*
000700 DATA                DIVISION.
000800 WORKING-STORAGE     SECTION.
000900 01  WK-C                  PIC S9(3) COMP-3.
001000 PROCEDURE   DIVISION
001100             USING  WK-C-I WK-C-O.
001200 MAIN-S.
001300*
001400     IF  WK-C-I = 1
001500       THEN
001600         MOVE  1  TO  WK-C-O
001700       ELSE
001800         IF  WK-C-I = 2  OR                    20110704
001850             WK-C-I = 4                        20110704
001900         THEN
002000           COMPUTE  WK-C = WK-C-I * 10
002100           MOVE  WK-C  TO  WK-C-O
002200         ELSE
002300           MOVE  9  TO  WK-C-I
002400*          COMPUTE  WK-C =                     20110704
002500*              WK-C-I * 5 - 5                  20110704
002550           COMPUTE  WK-C = WK-C-I * (1 + 10%)  20110704
002600           MOVE  WK-C   TO  WK-C-O
002700         END-IF
002800     END-IF.
002900*
003000 MAIN-E.
003100     GOBACK.
```

CHANGED PARTS

CHANGED PARTS

| LINE # | 1 | 2 | 3 | 4 |
|---|---|---|---|---|
| 15 | 001200 MAIN-S. | | | |
| 16 | 001300* | | | |
| 17 | 001400  IF WK-C-I = 1 | | | |
| 18 | 001500    THEN | 001700    ELSE | | |
| 19 | 001600    MOVE 1 TO WK-C-O | 001800*#O    IF WK-C-I = 2 OR | | |
|  |  | 001850*#O    WK-C-I = 4 | | |
|  |  | T00000*#I    IF WK-C-I = 2 OR WK-C-I = 4 | | |
|  |  | I00001    IF WK-C-I = 2 | | |
|  |  | I00002    THEN | I00003    ELSE | |
|  |  | 002000 COMPUTE WK-C = WK-C-I * 10 | I00004    IF WK-C-I = 4 | |
|  |  | 002100    MOVE WK-C TO WK-C-O | 001900    THEN | 002200    ELSE |
|  |  |  | 002000 COMPUTE WK-C = WK-C-I * 10 | 002300    MOVE 9 TO WK-C-I |
|  |  |  | 002100    MOVE WK-C TO WK-C-O | 002400* COMPUTE WK-C = |
|  |  |  |  | 002500* WK-C-I * 5 - 5 |
|  |  |  |  | 002550 COMPUTE WK-C = WK-C-I * (1 + 10%) |
|  |  |  |  | 002600    MOVE WK-C TO WK-C-O |
|  |  |  | I00005    END-IF | |
|  |  | 002700    END-IF | | |
| 41 | 002800    END-IF. | | | |
| 42 | 002900* | | | |
| 43 | 003000 MAIN-E. | | | |
| 44 | 003100    GOBACK. | | | |
| 45 | 001900    MOVE WK-C-O    TO WK-A-O. | | | |

SECONDARY SENTENCES GENERATED FROM CHANGED SENTENCES
(i.e. SECONDARY CHANGED PARTS)

FIG. 19

MODULE STRUCTURAL ANALYSIS SUPPORTING DEVICE AND PROGRAM

TECHNICAL FIELD

This invention relates to a device for supporting structural analysis of a module (source program) including one or more sentences written in a program language.

BACKGROUND ART

A structured programming is strongly recommended when a program is developed. Specifically, it is required to make a module by combining processing sections each including relatively few sentences. Moreover, a process common to a plurality of the modules is required to be modularized. Accordingly, for example, when a system includes programs whose total sum of sentences is over one million, the system often includes several thousand modules each having several ten processing sections.

In such a large-scale system as described above, persons involved in the development (that is to say, persons who sufficiently know the relation among the modules and the structure of each of the modules) maintain the system for a while after the development in many cases. However, such a system is often used over several ten years while repeatedly maintained. As time passing by, the persons involved in the development are gone so that persons who do not know the structures of the modules are required to maintain the system. In such a case, because the structured programming is used, it is required to figure out the functions each of which is described separately in a large amount of the modules so that the maintenance is extremely difficult. In other words, structural analysis of the module becomes difficult.

For example, each of Patent Document 1 and Patent Document 2 discloses a technique for supporting structural analysis of a module. Patent Document 1 discloses an automatic module block diagram generator which automatically creates a module block diagram. Patent Document 2 discloses an automatic test item generating device which automatically creates a flowchart and test items.

PRIOR ART DOCUMENTS

Patent Document(s)

Patent Document 1: JP A H11(1999)-110198
Patent Document 2: JP A 2006-209521

SUMMARY OF INVENTION

Technical Problem

However, when structural analysis of modules is done for maintenance of a system, it is necessary to figure out internal processing of each of the modules in detail. It is not easy to figure out full detail of a function distributed in many modules even if a module block diagram or a flowchart of each of the modules is used.

It is therefore an object of the present invention to provide a device which collects the function distributed in the many modules into a single secondary module to make it easy to figure out the function to support structural analysis of the module.

Solution to Problem

One aspect of the present invention provides a device configured to convert a module into a secondary module to support structural analysis of the module, wherein the module includes one or more sentences written in a program language, and wherein the secondary module includes one or more secondary sentences. The module is identifiable by a module name. The module is able to include one or more processing sections described therein, wherein the processing section includes one or more of the sentences. The processing section is identifiable by a processing section name. The module is able to includes a processing-section perform statement, a module call statement and a conditional statement described therein as the sentence. The processing-section perform statement is the sentence that identifies and performs the processing-section by using the processing section name. The module call statement is the sentence that identifies and performs the module by using the module name. The conditional statement is the sentence that selects the sentence to be executed by determining whether a conditional expression is satisfied or not. The conditional statement is able to include another conditional statement described therein as the sentence to be selected by the conditional statement so that the sentences are formable hierarchies by using the conditional statements. The device comprises a storage means and a conversion means. The storage means stores one or more of the modules. The conversion means is to convert a predetermined target module of the modules stored in the storage means into the secondary module to store the secondary module in the storage means. The conversion means has a read function, a conversion function and a write function. The read function is a function to read the target module from the storage means. The conversion function is a function that sequentially outputs each of the sentences described between a predetermined process start location and a predetermined process end location of the target module into the secondary module as the secondary sentence and that generates one or more of the secondary sentences from an expansion and outputs the generated secondary sentences into the secondary module when the sentence to be output into the secondary module is the processing-section perform statement or the module call statement, wherein the expansion being the sentences described in the processing section to be performed or in the module to be called, and wherein the expansion is further provided about the processing-section perform statement or the module call statement in the sentences of the expansion. The write function is a function to store the secondary module into the storage means.

Another aspect of the present invention provides a device configured to utilize (for example, to process) the secondary module to support structural analysis of the module. The device comprises a storage means and a utilizing means (for example, a processing means). The storage means stores the secondary module. The utilizing means is to utilize the secondary module stored in the storage means. The utilizing means has a read function, a utilizing function and a write function. The read function is a function to read the secondary module from the storage means. When the processing means is the utilizing means, the utilizing function is a hierarchy ID adding function, for example. The hierarchy ID adding function is a function to add a hierarchy ID to at least one of the secondary sentences of the secondary module. The hierarchy ID indicates the hierarchy where the secondary sentence belongs. The write function is a function to store the secondary module into the storage means, wherein the secondary module includes the secondary sentence into which the hierarchy ID is added, for example.

Still another aspect of the present invention provides a program which makes a computer function each of the devices.

Advantageous Effects of Invention

According to the present invention, since the sentences to be executed are expanded between the predetermined process start location and the predetermined process end location of the single module, it is possible to more easily figure out a function distributed in many modules.

Moreover, when the sentences to be executed are expanded only once with respect to each of the same processing section and the same module, redundant expansion can be avoided so that expanded amount can be reduced.

An appreciation of the objectives of the present invention and a more complete understanding of its structure may be had by studying the following description of the preferred embodiment and by referring to the accompanying drawings.

BRIEF DESCRIPTION OF DRAWINGS

FIG. 5 is a diagram partially showing an example of the secondary module of FIG. 1, wherein a part of the secondary module (a part enclosed by dotted line A) is enlarged to be illustrated in a part enclosed by continuous line A.

FIG. 6 is a diagram partially showing an example of a flowchart stored in the storage device of FIG. 1.

FIG. 7 is diagram partially showing an example of a matrix stored in the storage device of FIG. 1.

FIG. 15 is diagram partially showing another example of the matrix stored in the storage device of FIG. 1.

FIG. 16 is diagram showing an example of differences in a case where one of the modules of FIG. 3 is maintained.

FIG. 18 is diagram partially showing an example of a matrix in the case where the module of FIG. 16 is maintained.

FIG. 19 is diagram partially showing an example of a flowchart in the case where the module of FIG. 16 is maintained.

DESCRIPTION OF EMBODIMENTS

Figure 1:
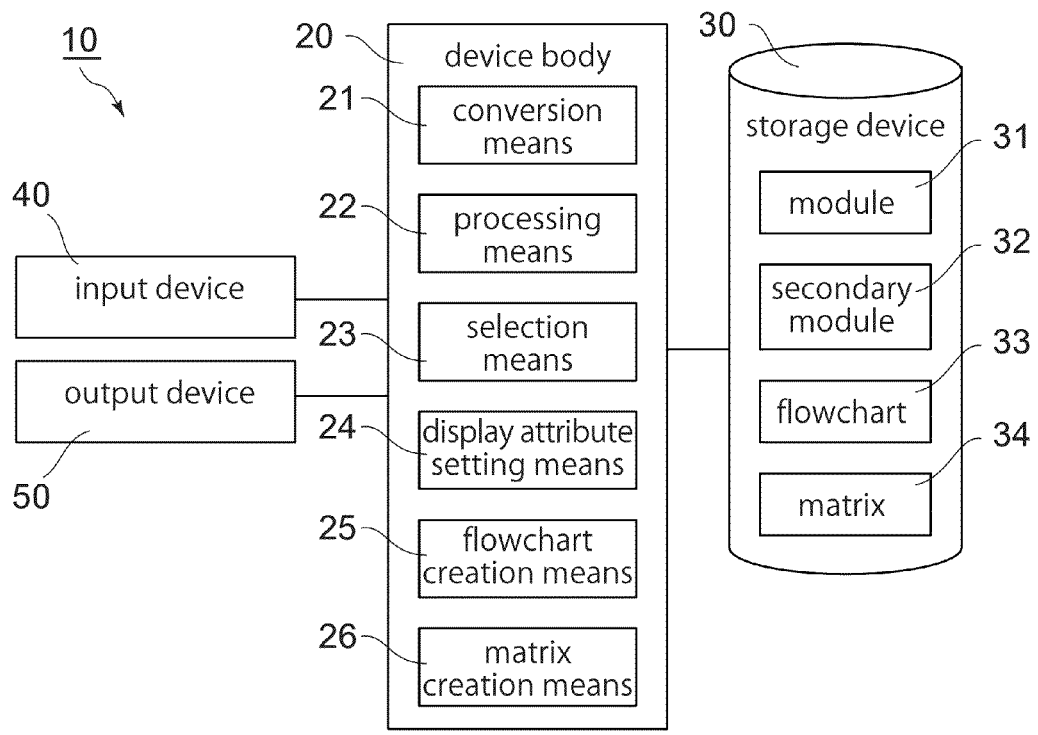
FIG. 1 is a block diagram showing a device supporting structural analysis of a module according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

As shown in FIG. 1, a device (module structural analysis supporting device) 10 according to an embodiment of the present invention comprises a device body 20, storage device (storage means) 30, input device 40 and an output device 50. The device 10 can convert a module (source program) including one or more sentences written in a program language into a secondary module (secondary source program) including one or more secondary sentences.

The program language according to the present embodiment is COBOL. However, the present invention is applicable for a program language other than COBOL.

The module according to the present embodiment can be identified by a module name which formed of combined letters, digits, symbols, and so on.

The module can include one or more processing sections described therein, wherein the processing section includes one or more of the sentences. The processing section according to the present embodiment is a section in COBOL. Each of the section can be identified by a section name (processing section name). However, when the program language is JAVA (registered trademark in Japan), for example, the processing section may be a function which can be identified by a function name (processing section name).

The module can call the module itself or the other modules. Moreover, the section of the module can perform the section itself or the other sections. More specifically, the module can include a processing-section perform statement and a module call statement therein as the sentences, wherein the processing-section perform statement is the sentence that identifies and performs the section by using the section name, and wherein the module call statement is the sentence that identifies and performs one of the modules by using the module name. Moreover, the module can include a conditional statement described therein as the sentence, wherein the conditional statement is the sentence that selects the sentence to be executed by determining whether a conditional expression is satisfied or not. Each of the processing-section perform statement and the module call statement may be a statement which specifies the function name. When the module call statement is the statement specifying the function name, the specified function of the module (i.e. a part of the module) is executed by the module call statement. In such a case, the module name may not be explicitly described, or the module name may be indirectly specified by the function name, in the module call statement.

According to the present embodiment, the processing-section perform statement is PERFORM statement. The module call statement is CALL statement. In addition, the conditional statement is each of IF statement and EVALUATE statement. The conditional statement such as IF statement can include the other conditional statement described therein as the sentence to be selected by the conditional statement so that the sentences can be nested (can form hierarchies) by using the conditional statements. For example, IF statement can be further described in THEN of IF statement.

As shown in FIG. 1, the storage device 30 is a magnetic disk unit, for example. The storage device 30 can store various files which are hierarchized, for example, by using folders (not shown). The storage device 30 is communicatively coupled to the device body 20 to be able to write (store) and read the file according to an instruction from the device body 20. The storage device 30 according to the present embodiment stores one or more modules 31. In other words, the module 31 according to the present embodiment is a module that is stored in the storage device 30. The module 31 is created by using a programming tool (not shown), for example. Each of the modules 31 may be a single file. On the other hand, a plurality of modules 31 may be stored in a single file. The storage device 30 can store a secondary module 32, a flowchart 33 and a matrix 34 in addition to the module 31. Each of the flowchart 33 and the matrix 34 according to the present embodiment can be created from the secondary module 32.

The input device 40 is a keyboard or a mouse, for example. The input device 40 is communicatively coupled to the device body 20 to be able to transmit a character input from the keyboard or a position indicated by the mouse to the device body 20.

The output device 50 is a display or a printer, for example. The output device 50 is communicatively coupled to the device body 20 to be able to display or print data (for example, a character or a figure) transmitted from the device body 20.

The device body 20 is a main body of a personal computer (PC), for example. The device body 20 has a central processing unit (CPU), a primary storage device (not shown) and so on. The storage device 30 stores executable files of various programs (not shown). CPU loads the executable files into the primary storage device to perform various functions by executing instructions in each of the executable files. In a process where CPU executes the instructions, a predetermined file stored in the storage device 30 is read into the variable region of the program via the buffer area in the primary storage device. The content of the file read into the variable region of the program is written into the storage device 30 via the buffer area of the primary storage device as necessary. As can be understood from the above explanation, each of the storage device 30 and the primary storage device functions as a readable and writable storage means according to the present embodiment. In other words, the storage means according to the present embodiment may be one of the storage device 30 and the primary storage device, or may be both of them. In the following explanation, the storage device 30 is used as the storage means.

The storage device 30 according to the present embodiment stores a conversion program, a processing program, a selection program, a display attribute setting program, a flowchart creation program and a matrix creation program (not shown). When the aforementioned programs are loaded into the primary storage device and executed by CPU, the computer functions as a conversion means 21, a processing means 22, a selection means 23, a display attribute setting means 24, a flowchart creation means 25 and a matrix creation means 26, respectively. Thus, the aforementioned programs are to make the computer function as the device 10 configured to support structural analysis of a module. In other words, the device body 20 of the device 10 according to the present embodiment comprises the conversion means 21, the processing means 22, the selection means 23, the display attribute setting means 24, the flowchart creation means 25 and the matrix creation means 26.

The conversion means 21 according to the present embodiment is to convert a predetermined target module 31 of the modules 31 stored in the storage device 30 into the secondary module 32 to store the secondary module 32 in the storage device 30. The processing means 22 is to process the secondary module 32 stored in the storage device 30. The selection means 23 is to select one or more of the secondary sentences of the secondary module 32 stored in the storage device 30. The display attribute setting means 24 is to set a predetermined display attribute to the secondary sentence of the secondary module 32 stored in the storage device 30. The flowchart creation means 25 is to create a table-form flowchart 33 from the secondary module 32 stored in the storage device 30. The matrix creation means 26 is to create a table-form matrix 34 which is formed of a plurality of columns and one or more rows from the secondary module 32 stored in the storage device 30.

Figure 2:
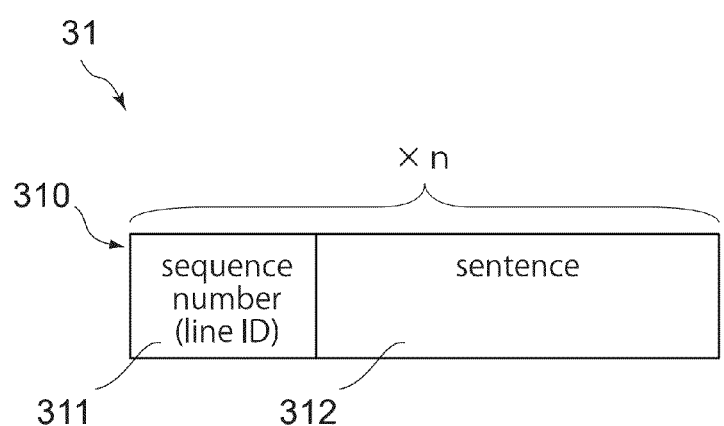
FIG. 2 is a diagram schematically showing a structure of a file of a module stored in a storage device of the device of FIG. 1.

As shown in FIG. 2, the module 31 according to the present embodiment is composed of n lines 310 (n≥1). The line 310 includes at least a sequence number (line ID) 311 and a sentence 312. The sequence number 311 is for identifying the line 310. The sequence number 311 may include characters or symbols as well as digits. The sentence 312 contains a sentence (for example, a data definition statement, an executable statement or a comment sentence) which is described therein. The complete single sentence may be wholly described in the sentence 312. On the other hand, a part of the single sentence may be described in the sentence 312. For example, MOVE statement may be separately described in the sentences 312 of two of the lines 310.

Figure 3:
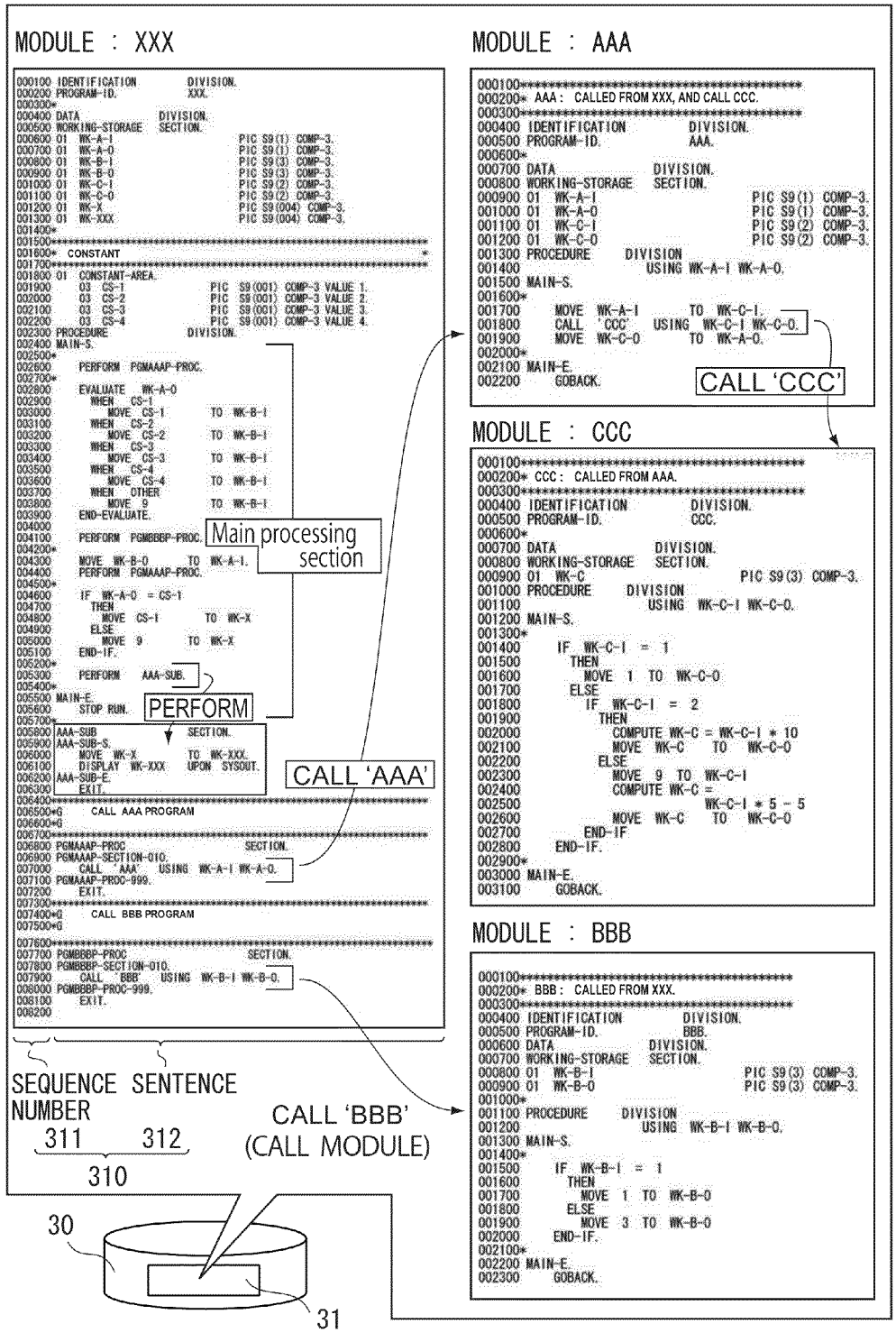
FIG. 3 is a diagram showing examples of the module of FIG. 2.

As shown in FIG. 3, the storage device 30 stores one or more of the modules 31. Each of the modules 31 includes a plurality of the lines 310 each having the sequence number 311 and the sentence 312. As can be seen from an example of the present embodiment shown in FIG. 3, the storage device 30 stores the module 31 having the module name of XXX (i.e. XXX module), the module 31 having the module name of AAA (i.e. AAA module), the module 31 having the module name of BBB (i.e. BBB Module) and the module 31 having the module name of CCC (i.e. CCC module). Hereafter, more specific explanation about the structure of the module 31 is made in reference to this example.

XXX module is a main module (i.e. a module where process begins). XXX module has the lines 310 where the respective CALL statements for identifying and calling AAA module and BBB module by using the modules names are described. AAA module has the line 310 where CALL statement which calls CCC module is described.

Each of the example modules 31 illustrated in FIG. 3 includes one or more of the sections. For example, XXX module has a main section (i.e. main processing section where process of the module begins) and sub sections (sub processing sections). The main section is composed of the lines 310 between the line 310 next to the line 310 where "PROCEDURE DIVISION." is described and the line 310 where "STOP RUN." is described. One of the subordinate sections (sub sections) is composed of the lines 310 between the line 310 where "AAA-SUB SECTION." is described and the line 310 where "EXIT." is described. The section name (processing section name) of the aforementioned sub-section is AAA-SUB. The main section includes the line 310 which identifies and performs AAA-SUB section by using its section name. More specifically, the main section includes the line 310 where "PERFORM AAA-SUB." is described.

Some of the example sections illustrated in FIG. 3 include the lines 310 where the conditional statements are described. For example, the main section of XXX module includes the lines 310 where EVALUATE statement having five WHEN clauses is described and the lines 310 where IF statement having THEN and ELSE is described. The main section of CCC module includes the lines 310 where IF statement is further described in ELSE of IF statement so that the conditional statements form hierarchies of the sentences 312.

Figure 4:
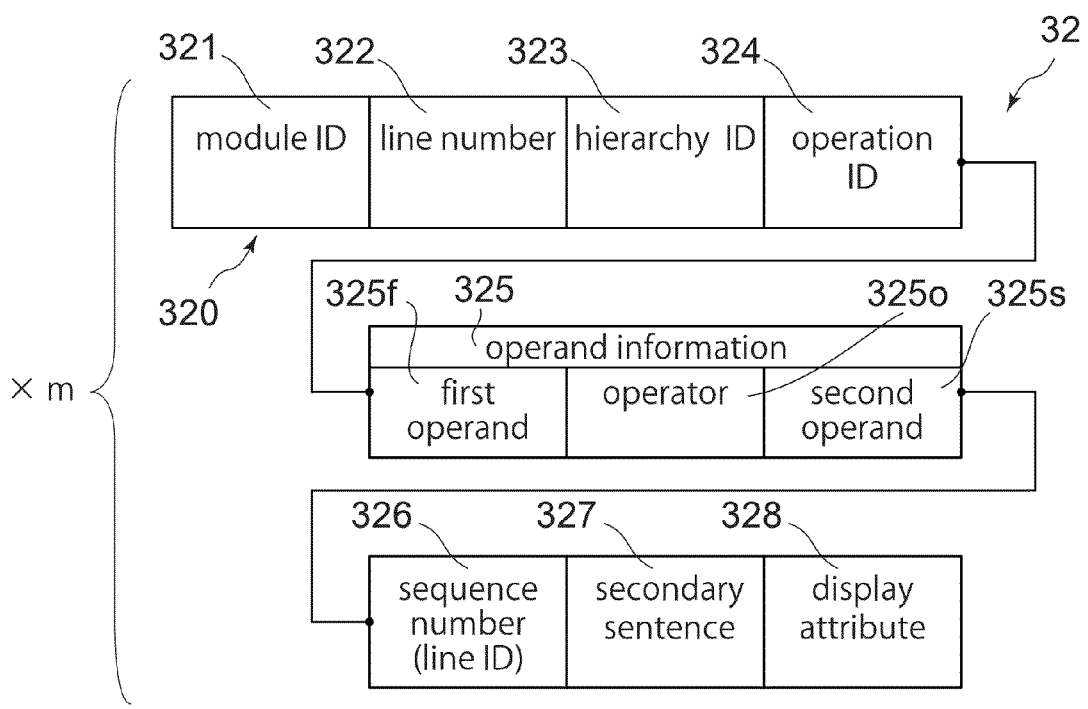
FIG. 4 is a diagram schematically showing a structure of a file of a secondary module stored in the storage device of FIG. 1.

As shown in FIG. 4, the secondary module 32 according to the present embodiment is composed of m lines 320 (m≥1). The secondary module 32 according to the present embodiment is a worksheet of MICROSOFT EXCEL (registered trademark in Japan). However, the secondary module 32 may be a text file, for example. The line 320 according to the present embodiment includes at least a module ID 321, a line number 322, a hierarchy ID 323, an operation ID 324, an operand information 325, a sequence number (line ID) 326, a secondary sentence 327 and a display attribute 328. The operand information 325 includes a first operand 325f, an operator 325o and a second operand 325s. The secondary module 32 is generated by collecting the lines 310, where the executable statements or the like are described, from one or more of the modules 31 while processing the lines 310.

Figure 5:
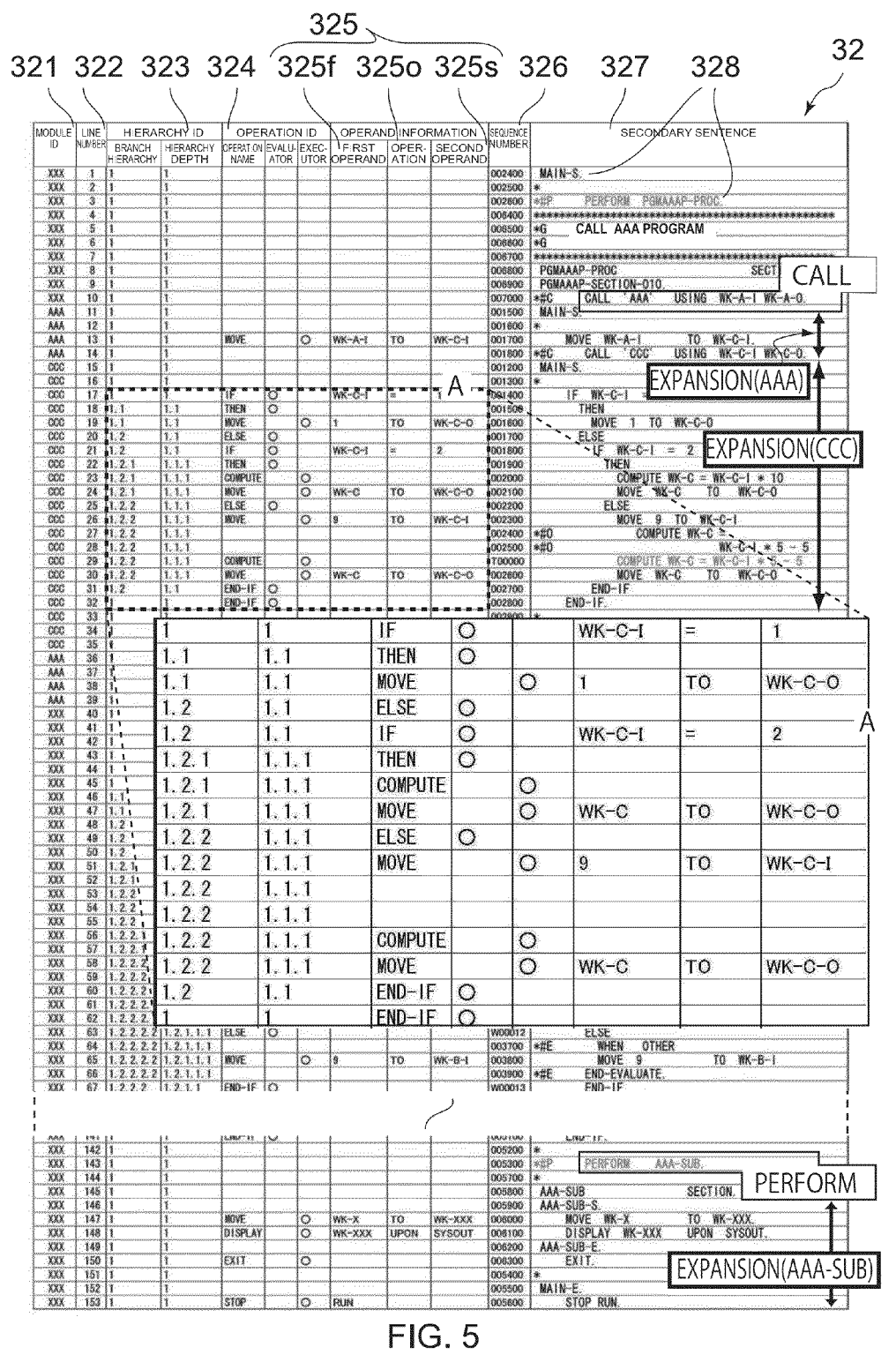

As shown in FIG. 5, an example of the secondary module 32 according to the present embodiment is generated by collecting and processing the lines 310 in PROCEDURE DIVISION of each of XXX module, AAA module, BBB module and CCC module.

As shown in the example of FIG. 5, CALL statement described in the sentence 312 of the line 310 is commented out in the secondary sentence 327 of the line 320, that is to say, changed into the comment sentence. The sentences 312 in PROCEDURE DIVISION of AAA module, which is to be called by CALL statement, are expanded to be the secondary sentences 327 of the lines 320, that is to say, expanded so that the secondary sentences 327 of the lines 320 are generated. Furthermore, the sentences 312 in PROCEDURE DIVISION of CCC module, which is to be called by CALL statement of AAA module, are expanded to be the secondary sentences 327 of lines 320. Similarly, PERFORM statement described in the sentence 312 of the line 310 is commented out in the secondary sentence 327 of the line 320. Furthermore, the sentences 312 in AAA-SUB section, which is to be performed by PERFORM statement, are expanded to be the secondary sentences 327 of the lines 320.

As shown in the example of FIG. 5, the conditional statements which are described in the sentences 312 and which are not IF statement (EVALUATE statement according to the present embodiment) are converted into IF statements in the secondary sentences 327. For example, the three sentences 312 where "EVALUATE WK-AO", "WHEN CS-1", "MOVE CS-1 TO WK-BI" are described, respectively, are converted into the five secondary sentences 327 where "* # E EVALUATE WK-AO" (comment sentence), "* # E WHEN CS-1" (comment sentence), "IF (WK-AO=CS-1)", "THEN" and "MOVE CS-1 TO WK-BI" are described, respectively. According to the present embodiment, in addition to the above conversions, the secondary sentences 327 to cover the lack of THEN, ELSE and END-IF in IF statement are generated. Moreover, a negative conditional expression is converted into an affirmative conditional expression. Moreover, IF statement having the conditional expressions coupled with each other by AND or OR is broken down into a plurality of IF statements, or converted into IF statements each having a simple secondary conditional expression which evaluates the relation of the two operands only by a single logical operator.

In addition to the above, MOVE statement or the like which is separately described in a plurality of the sentences 312 is joined into the single secondary sentence 327. Thus, each of the lines 320 of the secondary module 32 is generated based on the line 310 of the module 31 so that the secondary sentence 327 is generated either by just copying the sentence 312 or by expanding and processing the sentence 312.

The display attribute 328 contains an attribute related to representation such as a color, a background color or a font which is used, for example, when the secondary sentence 327 of the line 320 is displayed on the output device 50. For example, if the secondary sentence 327, which is generated by commenting out the sentence 312, is displayed with red color, it is possible to visually figure out that the commenting out is done.

The module ID 321 according to the present embodiment is to indicate the module 31 where the line 320 is based on. More specifically, the module ID 321 contains the module name (for example, XXX). However, the number or the like which can uniquely identify the module 31 may be set instead of the module name.

The sequence number 326 in the line 320 that has the secondary sentence 327 just copied from the sentence 312 contains copy of the sequence number 311 of the copied source line 310. The sequence number 326 in the line 320 that has one-to-one correspondence with the line 310 (for example, the line 320 of the secondary sentence 327 generated by commenting out the sentence 312) contains copy of the sequence number 311 of the corresponding line 310. On the other hand, the sequence number 326 of the created (added) line 320 contains an identifier (for example, a combination of symbols) which can indicate that the line 320 is created. Thus, the line 320 and the line 310 can be associated with each other when the system is maintained.

The line number 322 according to the present embodiment contains a sequence number which starts from 1 and is incremented by every line 320. However, the line number 322 may not be the sequence number. For example, the line number 322 may be a combination of characters and symbols.

The hierarchy ID 323 according to the present embodiment is composed of a branch hierarchy and a hierarchy depth. The branch hierarchy is used to identify a hierarchy formed by the conditional statements. The branch hierarchy according to the present embodiment is set in such a manner that uses 1 as a starting value at the first line 320. In other words, the branch hierarchy of the first line 320 is 1. The branch hierarchy is changed into 1.1 at the line 320 where THEN of IF statement is described while changed into 1.2 at the line 320 where ELSE is described. The branch hierarchy returns to 1 from the line 320 next to the line 320 where END-IF of IF statement is described. When generalized: at the line 320 where THEN is described, "0.1" is appended to the end of the branch hierarchy of the immediately preceding line 320; at the line 320 where ELSE is described, "0.1" of the end of the branch hierarchy of the immediately preceding line 320 is changed to "0.2"; and at the line 320 next to the line 320 where END-IF is described, "0.2" of the end of the branch hierarchy of the line 320 is deleted. Except the above cases, the branch hierarchy is set to a value same as that of the immediately preceding line 320.

Similar to the branch hierarchy, the hierarchy depth according to the present embodiment is set in such a manner that uses 1 as the starting value at the first line 320. In other words, the hierarchy depth of the first line 320 is 1. The hierarchy depth is changed into 1.1 at the line 320 where THEN of IF statement is described while returns to 1 from the line 320 next to the line 320 where END-IF of IF statement is described. Thereafter, the hierarchy depth is changed into 1.2 at the line 320 where THEN of IF statement is described while returns to 1 from the line 320 next to the line 320 where END-IF of IF statement is described. When generalized: the starting value of the hierarchy depth is 1; at the line 320 where THEN is described, a digit of ".p" (p is an integer equal to or more than 1) is appended to the end of the hierarchy depth; and at the line 320 next to the line 320 where END-IF is described, the end digit of ".p" is deleted. The value of p in ".p" starts from 1 for each digit. In detail, the value of p in ".p" of the first digit (for example, "0.2" of 1.2) starts from 1 and is incremented in every time to be appended. The value of p in ".p" of the second digit or the digit after the second digit (for example, "0.1" of 1.2.1) starts from 1 in a continuous range which is composed of the successive lines 320 having the same hierarchy depth as one another except the digit of ".p", and is incremented in every time to be appended in the continuous range.

As can be seen from the above explanation, the hierarchy ID 323 can be used to identify a specific one of the hierarchies formed by the conditional statements in the secondary module 32. The content of the hierarchy ID 323 is not limited to that of the above explanation. The hierarchy ID 323 may be set to any value, provided that it is possible to identify the specific one of the hierarchies formed by the conditional statements in the secondary module 32.

The operation ID 324 indicates a type of the sentence which is described in the secondary sentence 327. The operation ID 324 according to the present embodiment is composed of an operation name, an indicator which indicates whether an evaluator (evaluator indicator: simply described as "EVALUATOR" in FIG. 5) is described or not and an indicator (executor indicator: simply described as "EXECUTOR" in FIG. 5) which indicates whether an executor is described or not. When a part of elements of IF statement is described (i.e. when IF, THEN, ELSE or END-IF is described) in the secondary sentence 327, the evaluator indicator is set to O. When the executable statement other than IF statement is described (for example, when MOVE statement or COMPUTE statement is described) in the secondary sentence 327, the executor indicator is set to O. When one the evaluator indicator and the executor indicator is set to O, the operation name is set to an operation name described in the secondary sentence 327, namely, IF, THEN, END-IF, MOVE or the like.

The operand information 325 is set based on the secondary sentence 327 that includes an operation name which is set to the operation ID 324 (i.e. the secondary sentence 327 that includes an executable sentence described therein) and that includes two operands and one operator. For example, as for the secondary sentence 327 where "MOVE 9 TO WK-CI" is described, the first operand 325f, the operator 325o and the first operand 325s are set to "9", "TO" and "WK-C-I", respectively. By referring to the operand information 325, it is possible to more easily figure out how assignment or comparison between a constant and a variable is performed.

The line 320 may include various items in addition to the items described above. For example, when the line 320 includes the section name of the corresponding line 310, correspondence between the line 320 and the line 310 can be figured out more easily.

According to the present embodiment, various files can be created based on the secondary module 32 stored in the storage device 30. Each of the created files can be displayed on or printed from the output device 50 as a document which supports the structural analysis of the module 31. For example, a flowchart 33 and a matrix 34 can be created based on the secondary module 32.

As can be seen from FIGS. 6 and 7, each of the flowchart 33 and the matrix 34 according to the present embodiment is a worksheet of MICROSOFT EXCEL (registered trademark in Japan). However, each of the flowchart 33 and the matrix 34 may be a file or the like having another format. According to the present embodiment, each of the flowchart 33 and the matrix 34 is created from the secondary module 32.

As can be seen from FIG. 6, the flowchart 33 is created by arranging the secondary sentences 327 of the secondary module 32 in a flowchart-like manner. More specifically, the secondary sentences 327 that do not correspond to any IF statement are sequentially arranged in the 2nd column (the column having a header where "1" is illustrated) along arrangement order of the lines 320 of the secondary module 32. On the other hand, the secondary sentences 327 that correspond to some IF statement (i.e. the secondary sentences 327 each including the sentence described between IF and END-IF) are arranged so that the secondary sentence 327 that is to be executed when the conditional expression of IF statement is satisfied, and the secondary sentence 327 that is to be executed when the conditional expression of IF statement is not satisfied are separated from each other to be arranged at left and right sides.

The 1st column of the flowchart 33 contains the contents of the line numbers 322 of the secondary sentences 327 arranged in the 2nd column so that the rows of the flowchart 33 can be associated with the lines 320 of the secondary module 32, respectively. In addition to the line number 322, the flowchart 33 can includes any item in the line 320.

As can be seen from the above description, the number of the columns of the flowchart 33 according to the present embodiment increases as the hierarchies formed by IF statements becomes deeper. In other words, a part of the secondary module 32, where the rather complicated conditional statements are described, is output while being extended in a column direction of the table. Accordingly, when the flowchart 33 is displayed on the output device 50, the difference between processes corresponding to the true case and the false case of the conditional expression can be figured out by comparing the executable statements which are arranged and displayed at the left and right columns. Any process block in the flowchart 33 can be colored to be displayed on the output device 50. For example, it is possible to set a predetermined background color A to the cells of the flowchart 33 each containing IF or END-IF, to set a predetermined background color B to the secondary sentences 327 to be executed in THEN-process and to set a predetermined background color C to the secondary sentences 327 to be executed in ELSE-process. When the thus-colored flowchart 33 is displayed on the output device 50, the structure of the hierarchies formed by IF statements can be visually figured out as a pattern formed of the combined background colors.

As shown in FIG. 7, the matrix 34 according to the present embodiment is a table composed of a column of the line number (1st column), a column of the sequence number (2nd column), a column of the secondary sentence (3rd column) and one or more relation indicating columns (4th and later columns). Each of the columns includes one or more rows.

The column of the line number, the column of the sequence number and the column of the secondary sentence contain the content of the line number 322, the content of the sequence number 326 and the content of the secondary sentence 327 of the secondary module 32, respectively. Moreover, for example, the column of the secondary sentence also contains a display attribute based on the display attribute 328. The matrix 34 can includes any item included in the line 320 instead of the above items or in addition to the above items.

The number of the relation indicating columns is determined based on IF statements described in the secondary sentence 327 of the secondary module 32. For example, when the secondary module 32 includes only one IF statement which has only one THEN and only one ELSE, because the number of branches of IF statement (i.e. the number of cases performed in IF statement) is 2, the number of the relation indicating columns is 2. For example, when each of THEN and ELSE includes IF statement which has THEN and ELSE, because the number of cases to be performed is 4 (2×2), the number of the relation indicating columns is 4. For example, when two IF statements each having five cases to be performed are described, the number of the relation indicating columns may be 5 which is the maximum number of two numbers of the cases, or may be 25 (5×5) which is the number of the combinations of the cases. The number of the relation indicating columns of the sample illustrated in FIG. 7 is equal to the maximum value of the numbers, each of which is the number of the cases to be performed in corresponding IF statement. In detail, the matrix 34 of FIG. 7 includes the five relation indicating columns which correspond to the five cases, or the case C1 to the case C5, respectively.

Each of the relation indicating columns records a relation with the column of the secondary sentence (3rd column). More specifically, the row of the relation indicating column, which corresponds to the executable statement described in the column of the secondary sentence and executed in the case corresponding to the relation indicating column, is set to I, T, E, EI or O. On the other hand, the row which is not executed is set to "-". According to the present embodiment, I, T, E, EI and O indicate that the executable statements are IF, THEN, ELSE and END-IF of IF statement and the executable statement other than IF statement, respectively. The row corresponding to the sentence other than the executable statement (for example, comment sentence) is set to "*".

As can be seen from the above explanation, when the matrix 34 according to the present embodiment is displayed on the output device 50, it is possible to figure out a relation between the executable statements shown in the column of the secondary sentence and the case shown in the relation indicating column. Moreover, it is possible to figure out test cases which are necessary when the executable statements are changed in maintenance.

Hereafter, explanation is made in detail about the function and the process of the device 10 configured as described above.

Figure 8:
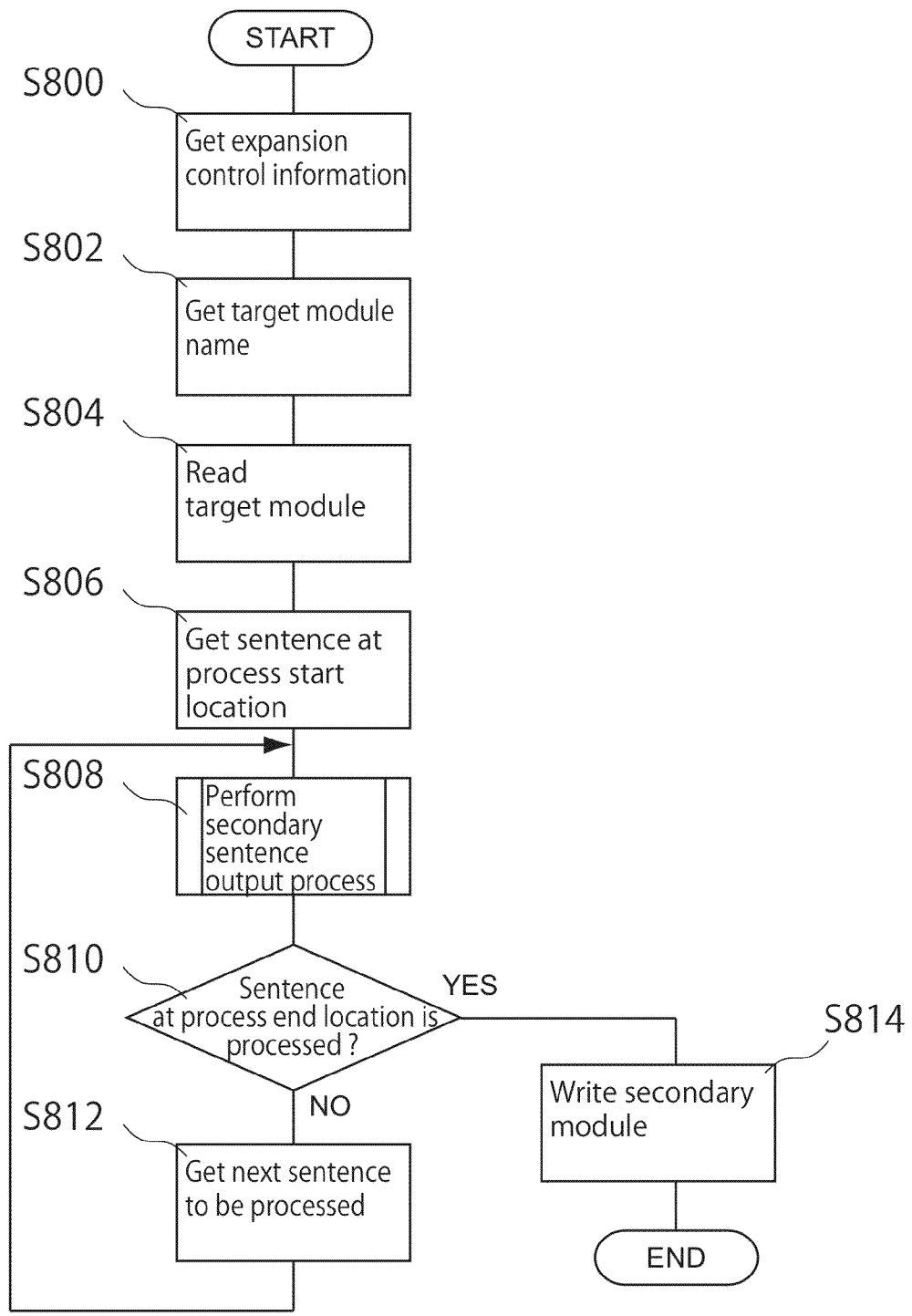
FIG. 8 is a flowchart showing functions of a conversion means of the device of FIG. 1.

As can be seen from FIG. 8, the conversion means 21 according to the present embodiment has a control information getting function (S800), a read function (S802 and S804), a conversion function (S806 to S812) and a write function (S814). The control information getting function is a function to get an expansion control information. The read function is a function to read the target module 31 to be performed of the modules 31 from the storage device 30. The conversion function is a function to convert the target module 31 into secondary module 32. The write function is a function to store the secondary module 32 into the storage device 30.

More specifically, as shown in FIG. 8, when the conversion means 21 is activated, for example, by a start instruction input from the input device 40, the conversion means 21 gets the expansion control information, for example, which is input as a part of the start instruction (S800). The expansion control information according to the present embodiment can optionally include an expansion limit indicator. The expansion limit indicator indicates that an expansion of the sentences described in the sentences 312 of each of the processing section to be performed and the module 31 to be called is provided only once at first time.

Then, the conversion means 21 gets the target module name which identifies the target module 31 (S802). The target module name can be obtained similar to the expansion control information. The conversion means 21 reads the target module 31 that is identified by the obtained target module name from the storage device 30 (S804). At this time, for example, the aforementioned target to be read may be limited to one of the modules 31 stored in a predetermined folder. If the target module 31 is not stored in the storage device 30, the conversion means 21 ends its process (not shown).

Then, the conversion means 21 gets the sentence 312 at the process start location of the target module 31 (S806). The process start location according to the present embodiment is the beginning of the main section. The conversion means 21 performs a secondary sentence output process by using the obtained sentence 312 (S808). Then, the conversion means 21 determines whether the sentence 312 at the process end location is already processed (S810). The process end location according to the present embodiment is the end of the main section. When already processed (YES at S810), the conversion means 21 writes the generated secondary module 32 into the storage device 30 (S814) and ends its process. On the other hand, when not yet processed (NO at S810), the conversion means 21 gets the sentence 312 to be processed next, or the sentence 312 of the next line 310 (S812) and performs the secondary sentence output process by using the obtained sentence 312 (S808).

Figure 9:
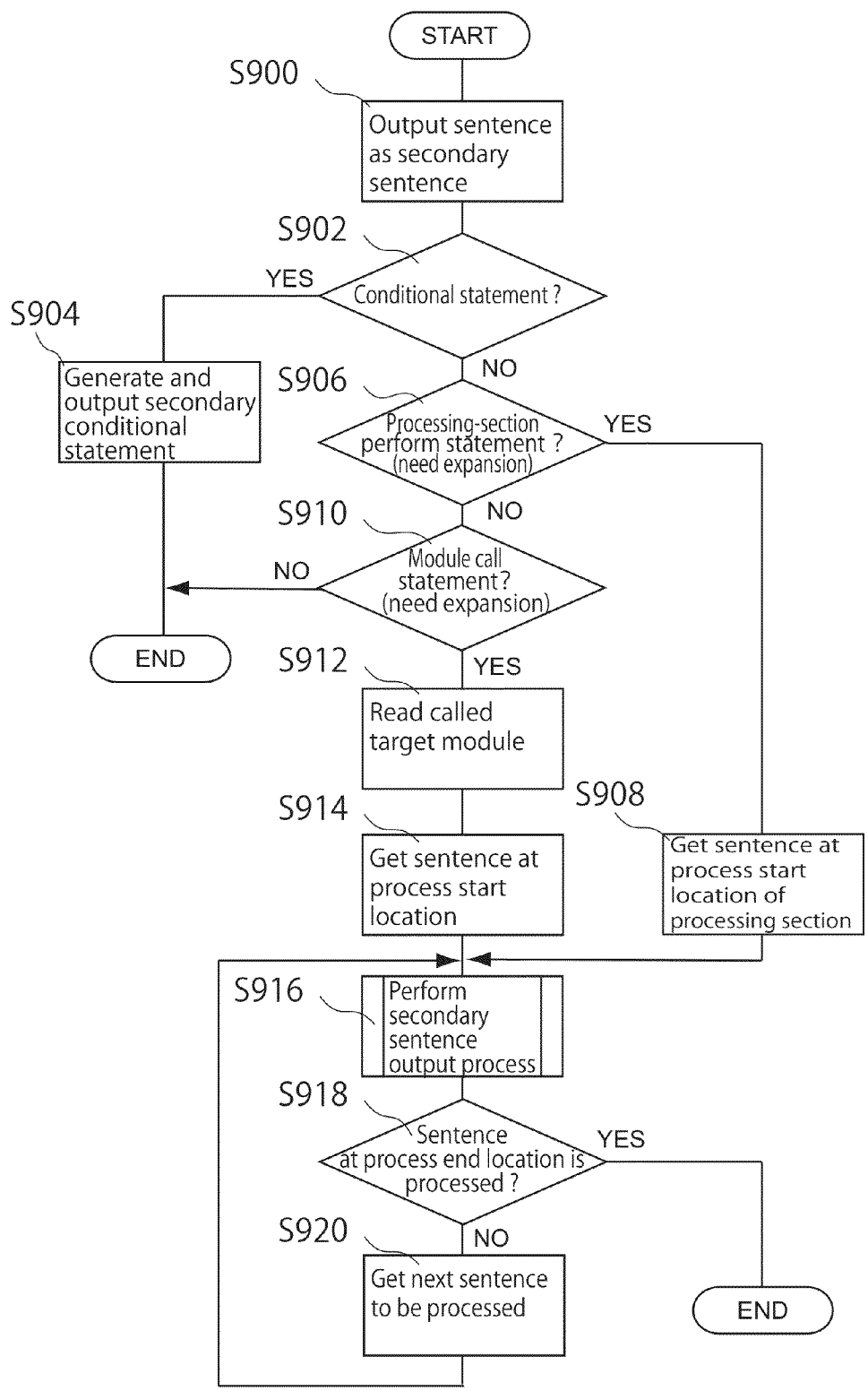
FIG. 9 is a flowchart showing, in further detail, a part of the function of the conversion means of FIG. 8.

FIG. 9 is a flowchart showing in more detail about the secondary sentence output process (S808) of the processes (functions) of the conversion means 21 shown in FIG. 8. As shown in FIG. 9, the conversion means 21 outputs the sentence 312 as the secondary sentence 327 under the secondary sentence output process (S900). More specifically, according to the present embodiment, the executable statement or the like described in the sentence 312 is copied to a predetermined row and column of a worksheet. Meanwhile, as previously described, the processing such as the commenting out of PERFORM statement is done. In addition, the conversion means 21 outputs the previously described contents into the module ID 321, the line number 322, the sequence number 326 and the display attribute 328.

Then, the conversion means 21 determines whether the conditional statement is described in the sentence 312 (S902). When the executable statement described in the sentence 312 is the conditional statement (YES at S902), the conversion means 21 performs a process such as the previously described process which converts the conditional statement other than IF statement into IF statement. More specifically, the conversion means 21 generates the secondary sentences 327 that include one or more secondary conditional statements (IF statements), each of which is a kind of the secondary sentence, based on the conditional expression of the conditional statement; the conversion means 21 forms the one or more hierarchies of the secondary sentences 327 by using the secondary conditional statements to output into the secondary module (S904); and the conversion means 21 ends the secondary sentence output process. The aforementioned secondary conditional statement is the conditional statement (secondary sentence 327) that selects the secondary sentence 327 to be executed by determining whether the secondary conditional expression is satisfied or not, wherein the secondary conditional expression evaluates the relation between the two operands to be evaluated by the only one operator.

When the executable statement described in the sentence 312 (a target sentence to be identified) is not the conditional statement (NO at S902), the conversion means 21 determines whether the target sentence to be identified is the processing-section perform statement (according to the present embodiment, PERFORM statement) or not (S906). When the target sentence to be identified is the processing-section perform statement (YES at S906), the conversion means 21 gets the sentence 312 at the process start location of the processing section (according to this embodiment, section) to be performed. According to the present embodiment, the process start location of the processing section is the beginning of the section.

When the target sentence to be identified is not the processing-section perform statement (NO at S906), the conversion means 21 determines whether the target sentence to be identified is the module call statement (according to the present embodiment, CALL statement) or not (S910). When the target sentence to be identified is the module call statement (YES at S910), the conversion means 21 reads the called target module 31 that is identified by CALL statement from the storage device 30 and gets the sentence 312 at the process start location of the called target module 31. At this time, for example, the aforementioned target to be read may be limited to the modules 31 stored in the predetermined folder where the target module 31 is stored. According to the present embodiment, the process start location of the called target module 31 is the beginning of the main section of that module 31. When the target sentence to be identified is not the module call statement (NO at S910), the conversion means 21 ends the secondary sentence output process.

The conversion means 21 recursively performs the secondary sentence output process by using the sentence 312 of the section to be performed or the sentence 312 of the called target module 31 (S916). Then, the conversion means 21 determines whether the sentence 312 at the process end location is already processed (S918). The process end location according to the present embodiment is either the end of the section to be performed or the end of the main section of the called target module 31. When already processed (YES at S918), the conversion means 21 ends the secondary sentence output process. On the other hand, when not yet processed (NO at S918), the conversion means 21 gets the next sentence 312 to be processed (the sentence 312 of the next line 310) and recursively performs the secondary sentence output process by using the obtained sentence 312 (S916).

The conversion means 21 does not expand recursive PERFORM statement (PERFORM statement which performs itself) into the sentences 312 of the section to be performed. Similarly, the conversion means 21 does not expand recursive CALL statement (CALL statement which calls itself) into the sentences 312 of the called target module. Moreover, when the expansion limit indicator is included in the expansion control information, the conversion means 21 does not perform the secondary sentence output process for PERFORM statement that performs the section having the section name same as that of the section that is already processed by the secondary sentence output process (although this is a process at S906, it is not described in the flowchart). Similarly, when the expansion limit indicator is included in the expansion control information, the conversion means 21 does not perform the secondary sentence output process for CALL statement that calls the module 31 having the module name same as that of the module 31 that is already processed by the secondary sentence output process (although this is another process at S906, it is not described in the flowchart).

As can be understood from the above explanation, the conversion function of the conversion means 21 sequentially outputs each of the sentences 312 described between the predetermined process start location and the predetermined process end location of the target module 31 into the secondary module as the secondary sentence 327. Moreover, the conversion function of the conversion means 21 generates one or more of the secondary sentences 327 from an expansion and outputs the generated secondary sentences 327 into the secondary module 32 when the sentence 312 is the processing-section perform statement or the module call statement, wherein the expansion is the sentences 312 described in the processing section to be performed or in the module 31 to be called. Moreover, the conversion function of the conversion means 21 further provides the expansion about the processing-section perform statement or the module call statement in the expanded sentences 312 (i.e. recursively expands). Accordingly, the function distributed in the many processing sections and the modules 31 can be collected in such a manner that the distributed function is hauled into the main section of the target module 31. As previously described, according to the present embodiment, the predetermined process start location and the predetermined process end location of the module 31 are the beginning and the end of the main section, respectively. However, the predetermined process start location and the predetermined process end location of the module 31 may be the beginning and the end of PROCRDURE DIVISON, respectively. For example, at least one of the predetermined process start location and the predetermined process end location may be located at the middle of the main section. However, the present embodiment is preferable in order to obtain a sufficient expansion while avoiding unnecessary expansion.

As can be understood from the above explanation, when the expansion limit indicator is included in the expansion control information, the conversion function of the conversion means 21 according to the present embodiment provides the expansion of the sentences 312 described in the processing section to be performed only once at first time with respect to the same processing section (i.e. expands the same processing section only once), and provides the expansion of the sentences 312 described in the module 31 to be called only once at first time with respect to the same module (i.e. expands the same module 31 only once). However, the conversion function of the conversion means 21 may expand the same processing section or the same module 31 only once regardless of whether the expansion limit indicator is included or not. On the other hand, the conversion function of the conversion means 21 may repeatedly expand the same processing section or the same module 31 regardless of whether the expansion limit indicator is included or not.

As described above, the secondary module 32 composed of the secondary sentences 327 is stored in the storage device 30 by the conversion means 21. In other words, the device 10 comprising the conversion means 21 can output the secondary module 32 composed of the secondary sentences 327 into the storage device 30.

Figure 10:
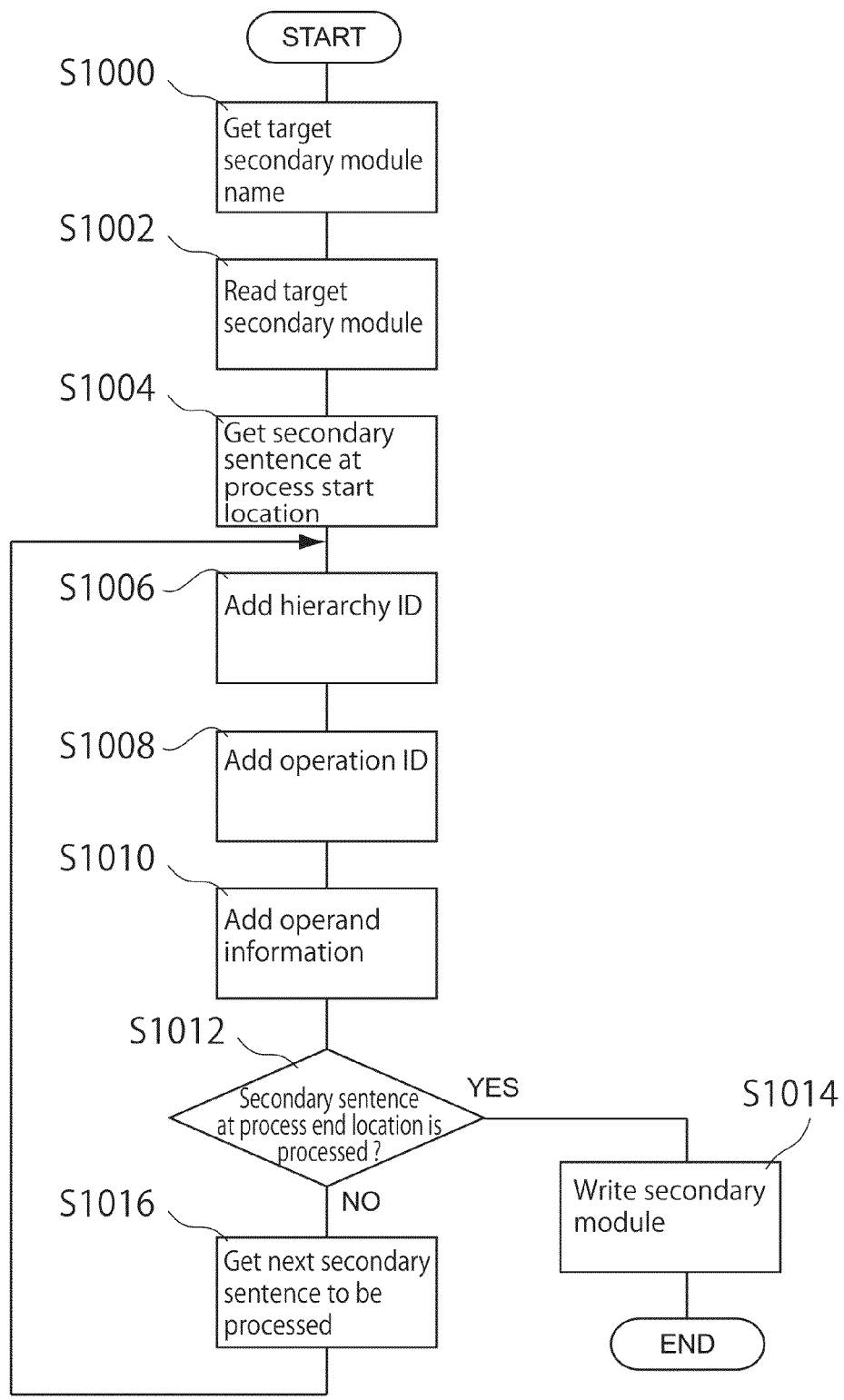
FIG. 10 is a flowchart showing functions of a processing means of the device of FIG. 1.

As can be seen from FIG. 10, the processing means 22 according to the present embodiment has a read function (S1000 and S1002), at least one of a hierarchy ID adding function (S1006) and an operand adding function (S1010), and a write function (S1014). The read function is a function to read a target secondary module 32 from the storage device 30. The hierarchy ID adding function is a function to add the hierarchy ID 323 to at least one of the secondary sentences 327 of the secondary module 32. The hierarchy ID 323 according to the present embodiment indicates the hierarchy where the secondary sentence 327 belongs. The operand adding function is a function to add the operand information 325 to specific one or more of the secondary sentences 327 of the secondary module 32, wherein each of the specific one or more of the secondary sentences 327 includes two operands each formed of a constant or a variable and one operator, and wherein the operand information 325 includes the two operands (the first operand 325*f* and the second operand 325*s*) and the one operator 325*o*. The write function is a function to store the secondary module 32, which includes the secondary sentence 327 into which the hierarchy ID 323 or the operand information 325 is added, into the storage device 30.

More specifically, as shown in FIG. 10, the processing means 22 is activated, for example, similar to the conversion means 21, and then the processing means 22 gets the secondary module name which identifies the target secondary module 32 (S1000). The processing means 22 reads the secondary module 32 that is identified by the obtained target secondary module name from the storage device 30 (S1002). If the target secondary module 32 is not stored in the storage device 30, the processing means 22 ends its process (not shown).

Then, the processing means 22 gets the secondary sentence 327 at a process start location of the target secondary module 32 (S1004). The process start location according to the present embodiment is the beginning of the secondary module 32.

The processing means 22 adds the hierarchy ID 323 with respect to the obtained secondary sentence 327 (S1006). More specifically, the processing means 22 according to the present embodiment outputs each of the aforementioned branch hierarchy and the aforementioned hierarchy depth into the row and column that corresponds to the hierarchy ID 323 of the line 320, in the worksheet (i.e. target worksheet) where the secondary module 32 to be performed is recorded. Then, the processing means 22 adds the operation ID 324 with respect to the obtained secondary sentence 327 (S1008). More specifically, the processing means 22 according to the present embodiment outputs each of the aforementioned operation name, the aforementioned evaluator indicator and the aforementioned executor indicator into the row and column that corresponds to the operation ID 324 of the line 320 in the target worksheet. Then, the processing means 22 adds the operand information 325 with respect to the obtained secondary sentence 327 (S1010). More specifically, the processing means 22 according to the present embodiment outputs each of the aforementioned first operand 325f, the aforementioned operator 325o and the aforementioned second operand 325s into the row and column that corresponds to the operand information 325 of the line 320 in the target worksheet.

Then, the processing means 22 determines whether the secondary sentence 327 at a process end location is already processed (S1012). The process end location according to the present embodiment is the end of the secondary module 32. When already processed (YES at S1012), the processing means 22 writes the processed secondary module 32 into the storage device 30 (S1014) and ends its process. On the other hand, when not yet processed (NO at S1012), the processing means 22 gets the secondary sentence 327 to be processed next, or the secondary sentence 327 of the next line 320 (S1016) and adds the hierarchy ID 323 as well as the other items to the obtained secondary sentence 327 (S1006 to S1010).

As described above, the secondary module 32 composed of the secondary sentences 327 each of which further includes the hierarchy ID 323, the operation ID 324 and the operand information 325 (according to the present embodiment, the worksheet where the hierarchy ID 323 and the other items are further output) is stored into the storage device 30 by the processing means 22. In other words, the device 10 comprising the processing means 22 can output the secondary module 32 composed of the secondary sentences 327, each of which further includes the hierarchy ID 323, the operation ID 324 and the operand information 325, into the storage device 30.

The processing means 22 may perform only one or two of the addition of the hierarchy ID 323 (S1006), the addition of the operation ID 324 (S1008) and the addition of the operand information 325 (S1010). For example, when the processing means 22 is activated, the input device 40 can be used to input an instruction which indicates whether the addition of the hierarchy ID 323 is to be performed or not.

Moreover, the conversion means 21 may perform one or two of the addition of the hierarchy ID 323, the addition of the operation ID 324 and the addition of the operand information 325. For example, the conversion means 21 can be designed to have at least one of the hierarchy ID adding function and the operand adding function, wherein the hierarchy ID adding function adds the hierarchy ID 323 with respect to the secondary sentence 327 which is to be output into the secondary module 32, and wherein the operand adding function adds the operand information 325 with respect to the secondary sentence 327.

Figure 11:
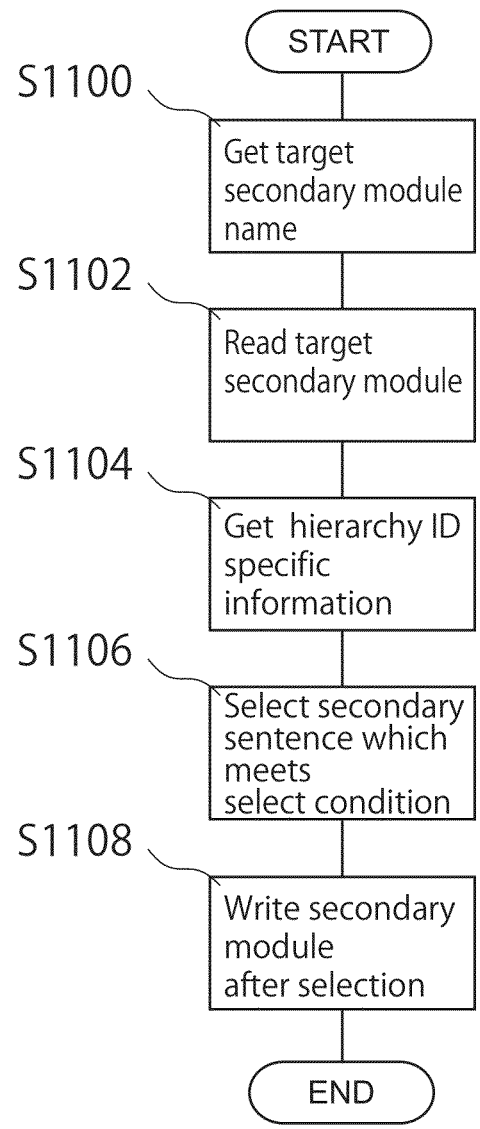
FIG. 11 is a flowchart showing functions of a selection means of the device of FIG. 1.

As can be seen from FIG. 11, the selection means 23 according to the present embodiment has a read function (S1100 and S1102), a specific information getting function (S1104), a selecting function (S1106) and a write function (S1108). The read function is a function to read a target secondary module 32 from the storage device 30. The specific information getting function is a function to get a hierarchy ID specific information. The hierarchy ID specific information specifies the hierarchy ID 323 of the secondary sentence 327 that is to be selected from the target secondary module 32. The selecting function is a function to select the secondary sentence 327 that has the hierarchy ID 323 same as the hierarchy ID specified by the hierarchy ID specific information from the target secondary module 32 to output the selected secondary sentence 327 into the secondary module 32 after selection. The write function is a function to store the secondary module 32 after selection, which is composed of the selected secondary sentences 327, into the storage device 30.

More specifically, as shown in FIG. 11, the selection means 23 is activated, for example, similar to the conversion means 21, and then the selection means 23 gets the secondary module name which identifies the target secondary module 32 (S1100). The selection means 23 reads the secondary module 32 that is identified by the obtained target secondary module name from the storage device 30 (S1102). If the target secondary module 32 is not stored in the storage device 30, the selection means 23 ends its process (not shown).

Then, the selection means 23 gets the hierarchy ID specific information (S1104). For example, the selection means 23 displays the target secondary module 32 (according to the present embodiment, the worksheet) on the output device 50, and when the row, which indicates the line 320, of the worksheet is double-clicked, the selection means 23 gets the hierarchy ID 323 shown in the double-clicked row to use as the hierarchy ID specific information.

Then, the selection means 23 continue to compare the obtained hierarchy ID specific information with the hierarchy ID 323 sequentially from the beginning line 320 until the end line 320 of the target secondary module 32. The selection means 23 selects one or more of the secondary sentences 327 each of which meets a select condition, or one or more of the secondary sentences 327 each of which is included in the line 320 that is between the beginning line 320 and the end line 320 and that includes the hierarchy ID 323 identified by the hierarchy ID specific information (S1106). The selection means 23 generates the secondary module 32 after selection (the worksheet after selection) that is composed of the lines 320 each including the secondary sentence 327 which meets the select condition.

Then, the selection means 23 writes the secondary module 32 after selection into the storage device 30 (S1108) and ends its process.

As can be understood from the above explanation, the secondary module 32 after selection is a part of the target secondary module 32, or the part which has the hierarchy ID specific information that is designated. Because the secondary module 32 is configured to be partially selectable, it is possible to compact a predetermined part including a process which should be checked and to display the predetermined part on the output device 50, for example, when the maintenance is performed. Moreover, the secondary sentence 327 may be selected without directly specifying the hierarchy ID 323. For example, the selection means 23 may retrieve the line number 322 which is identified by a line number input by the input device 40. In this case, the secondary sentence 327 may be selected by using the hierarchy ID 323 corresponding to the retrieved line number 322.

Figure 12:
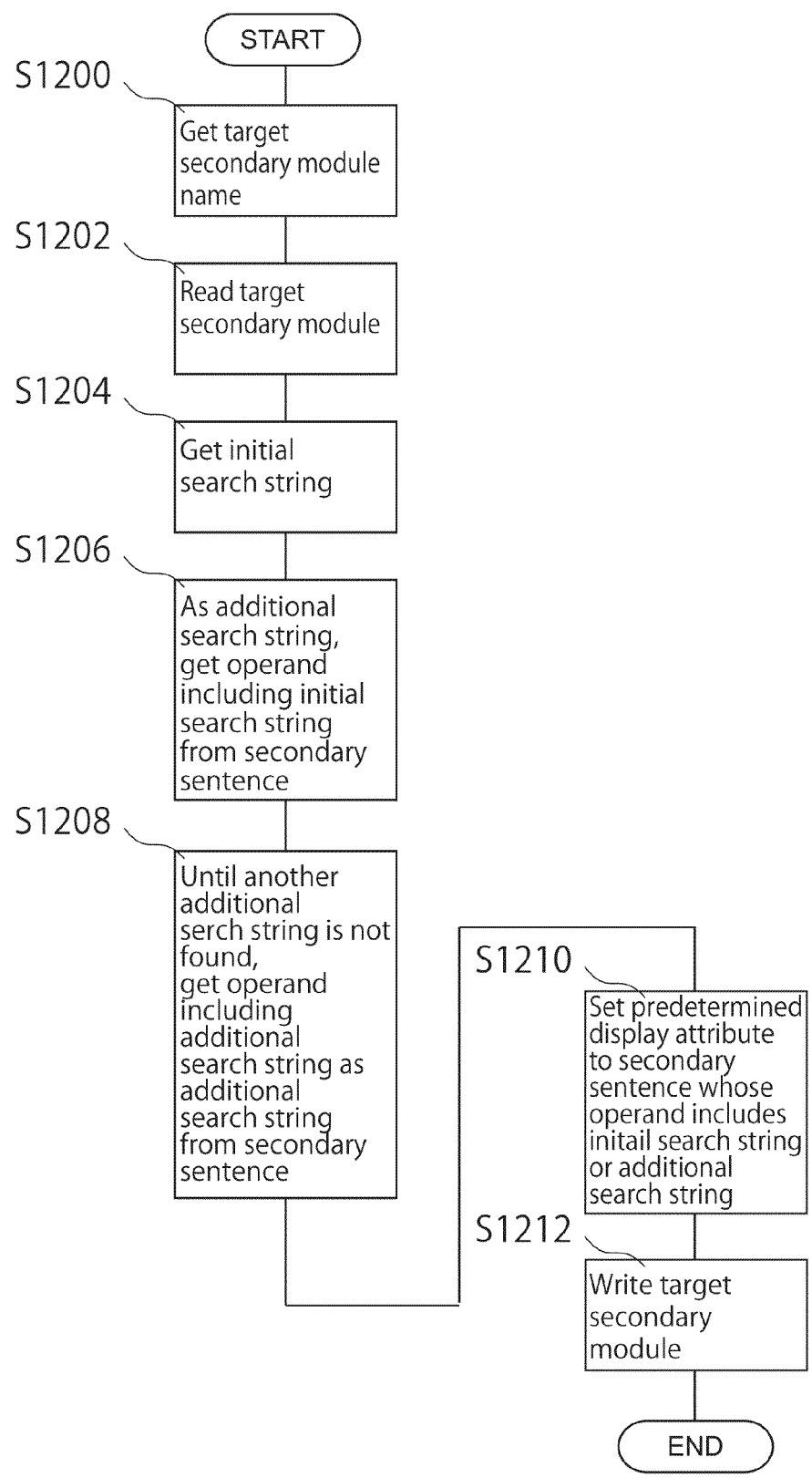
FIG. 12 is a flowchart showing functions of a display attribute setting means of the device of FIG. 1.

As can be seen from FIG. 12, the display attribute setting means 24 according to the present embodiment has a read function (S1200 and S1202), an initial search string getting function (S1204), a display attribute setting function (S1206 to S1210) and a write function (S1212).

More specifically, as shown in FIG. 12, the display attribute setting means 24 is activated, for example, similar to the conversion means 21, and then the display attribute setting means 24 gets the secondary module name which identifies the target secondary module 32 (S1200). The display attribute setting means 24 reads the target secondary module 32 that is identified by the obtained secondary module name from the storage device 30 (S1202). If the target secondary module 32 is not stored in the storage device 30, the display attribute setting means 24 ends its process (not shown).

Then, the display attribute setting means 24 gets an initial search string (S1204). The initial search string according to the present embodiment is a name of a variable (i.e. variable name) which is to be referred to or updated in the secondary sentence 327. The initial search string may be a part of the variable name or may be a constant which is referred to in the secondary sentence 327.

Then, the display attribute setting means 24 gets one or more of the first operands $325f$ and the second operands $325s$, each of which includes the initial search string, from the secondary sentences 327 as additional search strings (S1206).

More specifically, the display attribute setting means 24 searches the secondary sentences 327 of the target secondary module 32 to retrieve the secondary sentence 327 that has the initial search string included in the first operand $325f$ or the second operand $325s$ of the operand information 325. In the aforementioned search, not only a simple string search but also a more advanced string search may be done. For example, the display attribute setting means 24 may use a variable which is redefined by REDEFINES clause, and in this case the display attribute setting means 24 may search for a string with a redefined variable name. Specifically, for example, in a case where: the variable name "VRBL" is redefined to the variable name "WV"; the variable name "VVV" is set to the first operand $325f$; and the initial search string is "VRBL", the display attribute setting means 24 may determine that the first operand $325f$ includes the initial search string. Any substantial determination whether the initial search string is included or not may be done without being limited to the aforementioned example of REDEFINE clause. For example, the aforementioned determination can be done by storing DATA DIVISION of the module 31 into the storage device 30 in association with the generated secondary module 32 when the conversion means 21 generates the secondary module 32 from the module 31.

The display attribute setting means 24 according to the present embodiment gets both the first operand $325f$ and the second operand $325s$ as the additional search strings when at least one of the first operand $325f$ and the second operand $325s$ includes the initial search string.

Then, the display attribute setting means 24 continue to get one or more of the first operands $325f$ and the second operands $325s$ including the additional search string from the secondary sentences 327 as the additional search string until another additional search string is not found (S1208). More specifically, the display attribute setting means 24 further searches the secondary sentences 327 to retrieve the secondary sentence 327 that has the additional search string included in the first operand $325f$ or the second operand $325s$ of the operand information 325. The search method in this case is similar to the search method for the initial search string. For example, the display attribute setting means 24 gets both the first operand $325f$ and the second operand $325s$ as the additional search strings when at least one of the first operand $325f$ and the second operand $325s$ includes the additional search string.

Then, the display attribute setting means 24 sets a predetermined display attribute (for example, a background color which can be used for highlighting) into the display attribute 328 of the line 320 that includes the specified secondary sentence 327, wherein the first operand $325f$ or the second operand $325s$ of the operand information 325 of the specified secondary sentence 327 includes the initial search string or the additional search string (S1210).

Then, the display attribute setting means 24 writes the secondary module 32, which includes the secondary sentence 327 or the other item to which the predetermined display attribute is set, into the storage device 30 (S1212). Thus, the display attribute setting means 24 updates the target secondary module 32 (S1212) and ends its process.

As can be understood from the above explanation, after the setting of the display attribute to the secondary sentences 327 of the secondary module 32, the display attribute such as the predetermined background is set to the secondary sentence 327 that refers to or updates the variable corresponding to the initial search string. Accordingly, for example, when the maintenance is performed, a process associated with a predetermined variable can be noticeably displayed on the output device 50. Moreover, the associated process can be more visually figured out, for example, when the secondary sentence 327 including the initial search string and the secondary sentence 327 including the additional search string are displayed with background colors different from each other.

Figure 13:
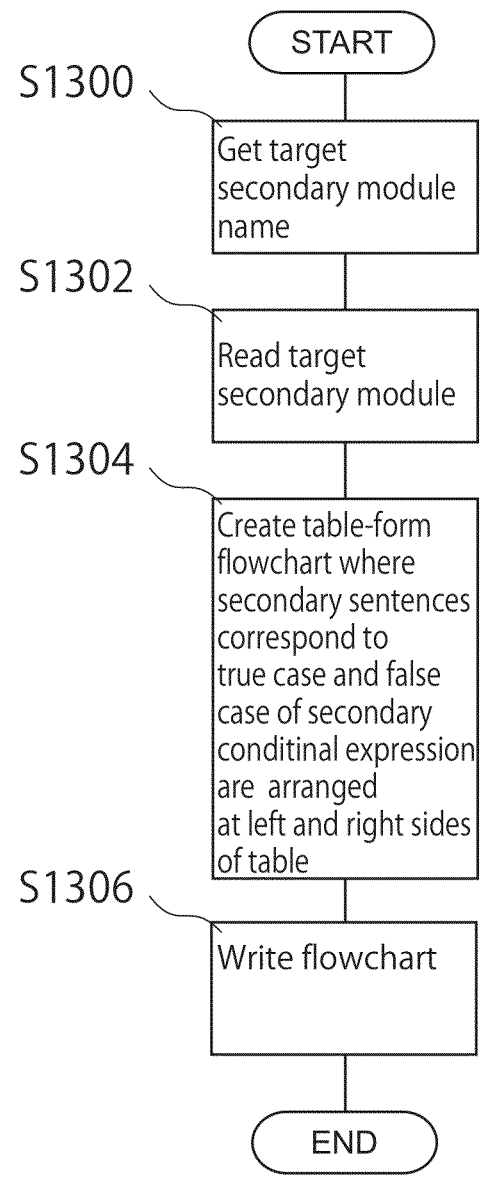
FIG. 13 is a flowchart showing functions of a flowchart creation means of the device of FIG. 1.

As can be seen from FIG. 13, the flowchart creation means 25 according to the present embodiment has a read function (S1300 and S1302), a flowchart creation function (S1304) and a write function (S1306).

More specifically, as shown in FIG. 13, the flowchart creation means 25 is activated, for example, similar to the conversion means 21, and then the flowchart creation means 25 gets the secondary module name which identifies the target secondary module 32 (S1300). The flowchart creation means 25 reads the target secondary module 32 that is identified by the obtained secondary module name from the storage device 30 (S1302). If the target secondary module 32 is not stored in the storage device 30, the flowchart creation means 25 ends its process (not shown).

Then, the flowchart creation means 25 creates a table-form flowchart 33 where the secondary sentences 327 which correspond to the true case and the false case of the secondary condition expression, respectively, are arranged at left and right sides of a table (S1304). More specifically, the flowchart creation means 25 creates the flowchart 33 of the secondary sentences 327 of the secondary module 32, wherein the secondary sentences 327 that belong to the hierarchy same as one another are arranged in the flowchart 33 so that the secondary sentence 327 to be executed when the secondary conditional expression is satisfied and the secondary sentence 327 to be executed when the secondary conditional expression is not satisfied are placed at the left and right sides of the table, and wherein each of the hierarchies of the secondary sentences 327 is specified by the hierarchy ID 323. The flowchart creation means 25 according to the present embodiment determines that the hierarchies specified by the respective hierarchy IDs 323 are same as one another when the hierarchy depths of the hierarchy IDs 323 are same as one another and the branch hierarchies of the hierarchy IDs 323 are same as one another except the end digits ("1" or "2") of the respective branch hierarchies. In addition, the flowchart creation means 25 sets the line number 322 so as to correspond to the secondary sentence 327 of the flowchart 33.

Then, the flowchart creation means 25 writes the flowchart 33 into the storage device 30 (S1306) and ends its process.

Figure 14:
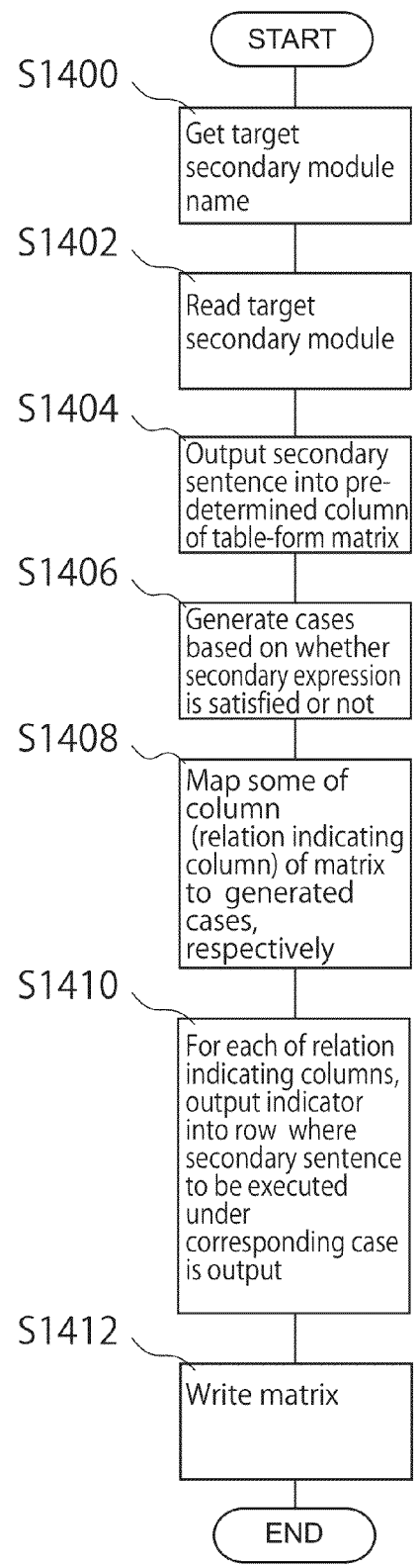
FIG. 14 is a flowchart showing functions of a matrix creation means of the device of FIG. 1.

As can be seen from FIG. 14, the matrix creation means 26 according to the present embodiment has a read function (S1400 and S1402), a secondary sentence output function (S1404), a case generation function (S1406), a matrix creation function (S1408 and S1410) and a write function (S1412).

More specifically, as shown in FIG. 14, the matrix creation means 26 is activated, for example, similar to the conversion means 21, and then the matrix creation means 26 gets the secondary module name which identifies the target secondary module 32 (S1400). The matrix creation means 26 reads the target secondary module 32 that is identified by the obtained secondary module name from the storage device 30 (S1402). If the target secondary module 32 is not stored in the storage device 30, the matrix creation means 26 ends its process (not shown).

Then, the matrix creation means 26 outputs the secondary sentences 327 into a predetermined column of a table-form matrix 34 (S1404). In detail, the matrix creation means 26 outputs the line numbers 322, the sequence numbers 326 and the secondary sentences 327 of the target secondary module 32 into the respective rows of the predetermines columns, namely, the 1st to 3rd columns, of the matrix 34.

Then, the matrix creation means 26 generates cases based on whether the secondary conditional expression is satisfied or not (S1406). In detail, the matrix creation means 26 uses one or more of the secondary conditional expressions described in the secondary sentences 327 of the secondary module 32 to generate the cases, wherein the cases include each of a case where all of the one or more of the secondary conditional expressions are satisfied, another case where a part of the one or more of the secondary conditional expressions are satisfied and still another case where all of the one or more of the secondary conditional expressions are not satisfied. In the meantime, the matrix creation means 26 may generate the cases from each of IF statements described in the secondary sentences 327 each having the branch hierarchy of the hierarchy ID 323 of "1" (IF statements in the highest hierarchy), while the matrix creation means 26 may generate the cases by combining all of the cases generated from IF statements in the highest hierarchy. Moreover, the matrix creation means 26 may generate the cases by combining some of the cases generated from IF statements in the highest hierarchy.

Then, the matrix creation means 26 maps some of the columns of the matrix 34 to the generated cases as relation indicating columns, respectively (S1408). For example, when the number of the generated cases is five, the 4th to 8th columns are mapped to the 1st to 5th cases, respectively. In this case, for example, the relation indicating column corresponding to the 3rd case is the 6th column.

Then, for each of the relation indicating columns, the matrix creation means 26 outputs an indicator into the row where the secondary sentence 327, which is to be executed under the case corresponding to the relation indicating column, is output, wherein the indicator indicates that the secondary sentence 327 output into the row is to be executed (S1410). More specifically, as previously described, the indicator such as O or I is output.

Then, the matrix creation means 26 writes the matrix 34 into the storage device 30 (S1412) and ends its process.

The matrix creation means 26 can create the matrixes 34 as shown in FIGS. 7 and 15. The matrix 34 partially shown in FIG. 7 includes the cases generated from each of a plurality of IF statements in the highest hierarchy so that the number of the cases is 5. The matrix 34 partially shown in FIG. 15 includes the cases generated by combining all of the cases generated from each of the plurality of IF statements in the highest hierarchy so that the number of the cases is 180.

The device 10 according to the present embodiment can also visually display the changed parts of the module 31 on the output device 50 when the module 31 is changed by the maintenance.

For example, as shown in FIG. 16, when CCC module is maintained, the differences between CCC module before maintenance and CCC module after maintenance can be obtained by comparing between CCC module before maintenance and CCC module after maintenance. For example, the differences between before maintenance and after maintenance can be stored into the storage device 30 as a text file (differential file) where the module name (CCC) is add to each of the lines of the differences. In this case, as described below, the matrix creation means 26 may create the matrix 34 by using the differential file.

Figure 17:
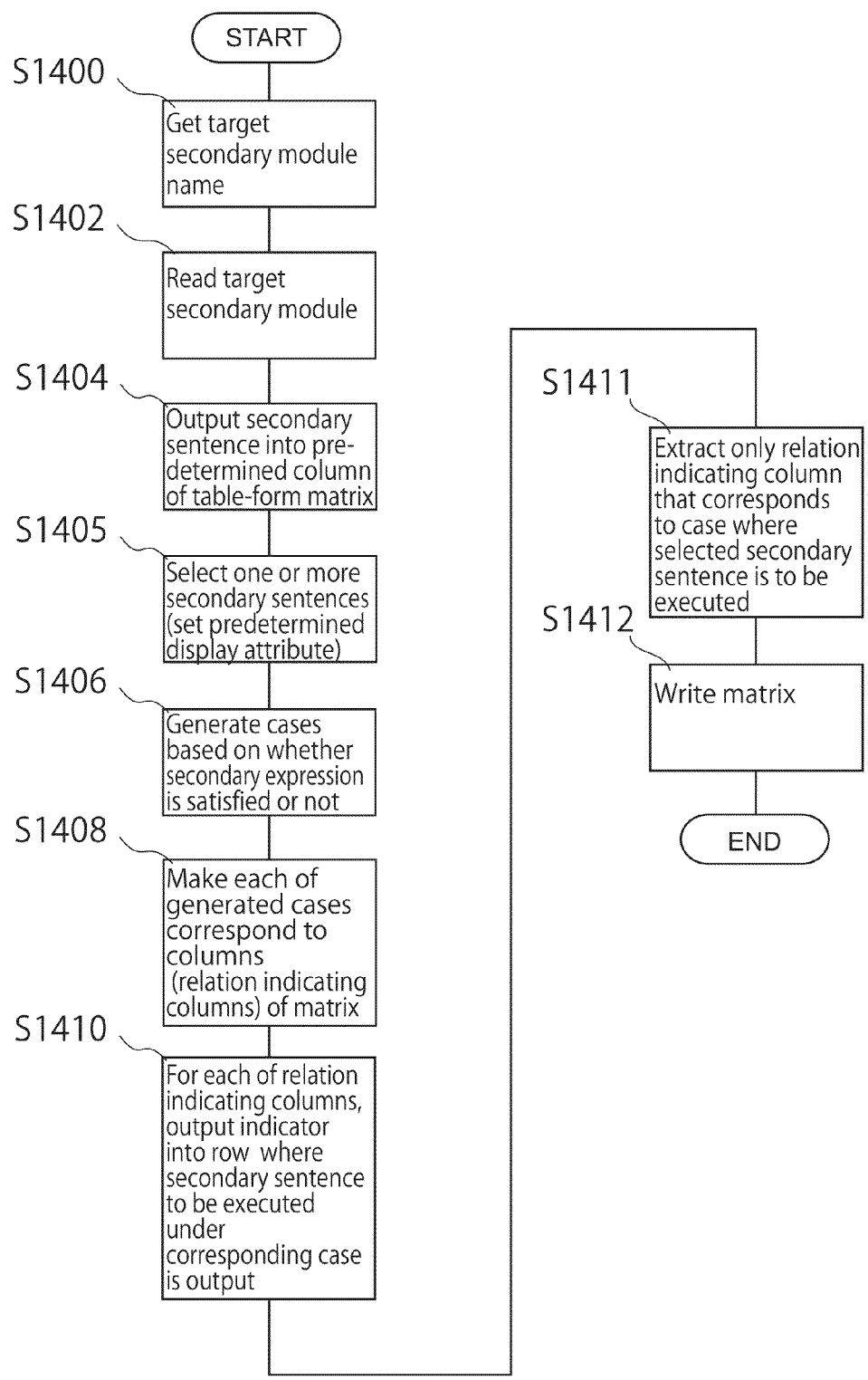
FIG. 17 is a flowchart showing a modification of the functions of the matrix creation means of FIG. 14.

As shown in FIG. 17, the matrix creation means 26 according to a first modification has the matrix creation function which selects one or more of the secondary sentences 327 of the secondary module 32 stored in the storage device 30 and sets a predetermined display attribute to the display attribute 328 (S1405). More specifically, the matrix creation means 26 according to the first modification reads the differential file from the storage device 30. Then, for each of the lines in the differential file, the matrix creation means 26 retrieves the line 320 that includes the module ID 321 identical to that of the line and the sequence number 326 identical to that of the line, and sets a display attribute for highlighting (for example, a background color) to the display attribute 328 of the retrieved line 320.

Moreover, the matrix creation means 26 according to the first modification extracts, as a target to be stored, only the relation indicating column that corresponds to the case where the selected secondary sentence 327 is to be executed (S1411).

Except for the points described above, the matrix creation means 26 according to the first modification has the functions same as those of the matrix creation means 26 according to the previously described present embodiment. The matrix creation means 26 according to the first modification can create the matrix 34 only from the cases that have relations with the differences between the module 31 before maintenance and the module 31 after maintenance. Accordingly, test cases related to the function changed by the maintenance can be more easily created. In addition to the aforementioned explanation, the matrix creation means 26 may not extract the relation indicating column corresponding to the case to be executed while sets the display attribute for highlighting (second modification).

Figure 18:
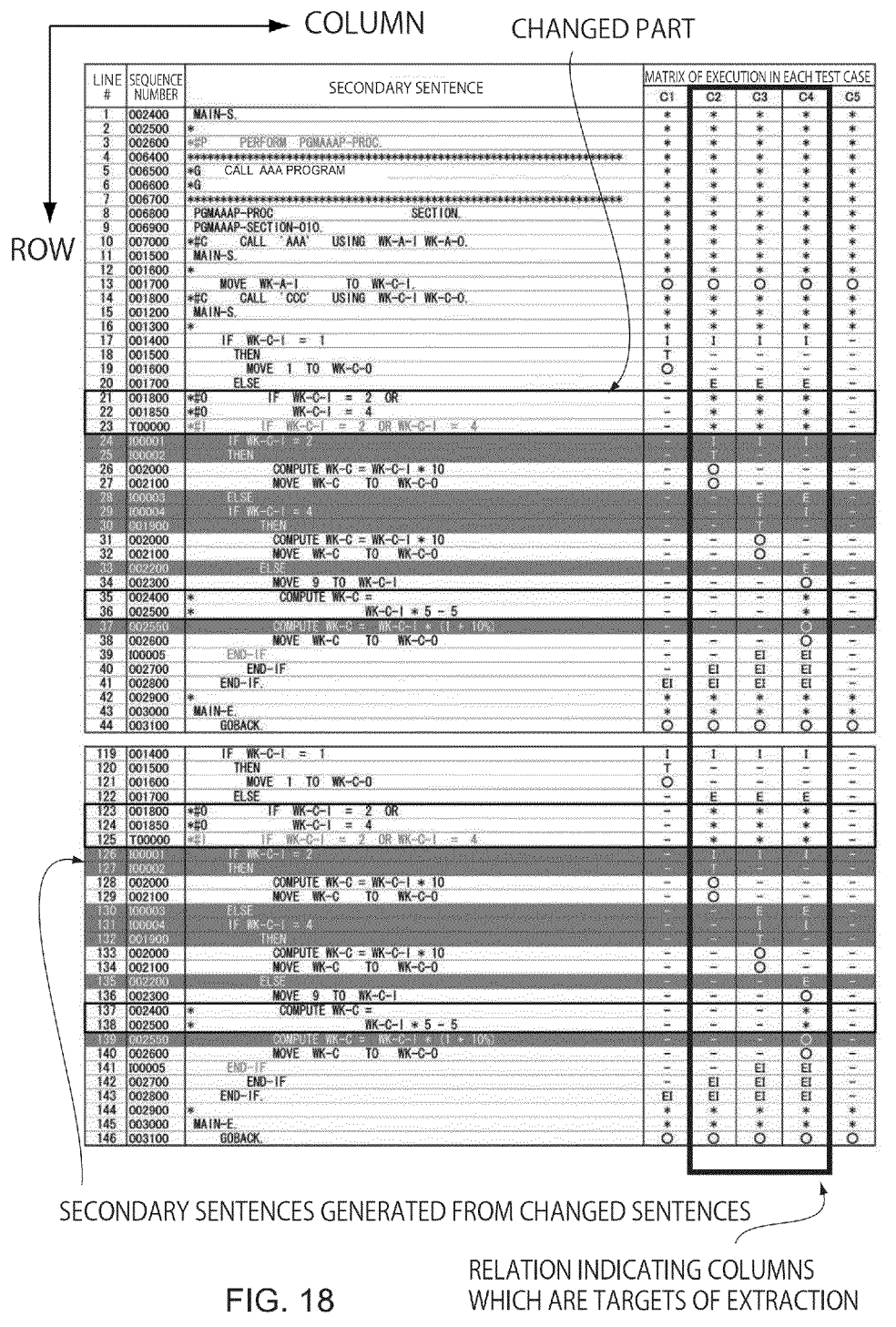

As can be seen from FIG. 18, when the matrix 34 created by the second modification of the matrix creation means 26 is displayed on the output device 50, the line 320 corresponding to the changed sentence 312 (i.e. changed part) and the line 320 including the secondary sentence 327 generated from the changed sentence 312 (i.e. secondary changed part) are displayed with the respective colors each of which is different from the color of the other line 320. Accordingly, visual understanding can be more easily done from the displayed content of the relation showing column related to the changed part or the secondary changed part so that the related case can be more easily selected. More specifically, when one of O, I, T, E, and EI is displayed on the relation showing column of the row of the changed part or secondary changed part, it is possible to understand that this case is related to the changed function.

As shown in FIG. 18, in the example where CCC module is changed as described above, the cases related to the changed function are "C2" to "C4". Accordingly, when the matrix 34 is created by the matrix creation means 26 according to the first modification, the created matrix 34 does not include the 4th column and the 8th column while including the 1st to 3rd columns and the 5th to 7th columns of FIG. 18.

As can be seen from FIG. 19, the flowchart creation means 25 also can be modified similar to the second modification of the matrix creation means 26 so that the changed part and the secondary changed part can be highlighted.

Figure 20:
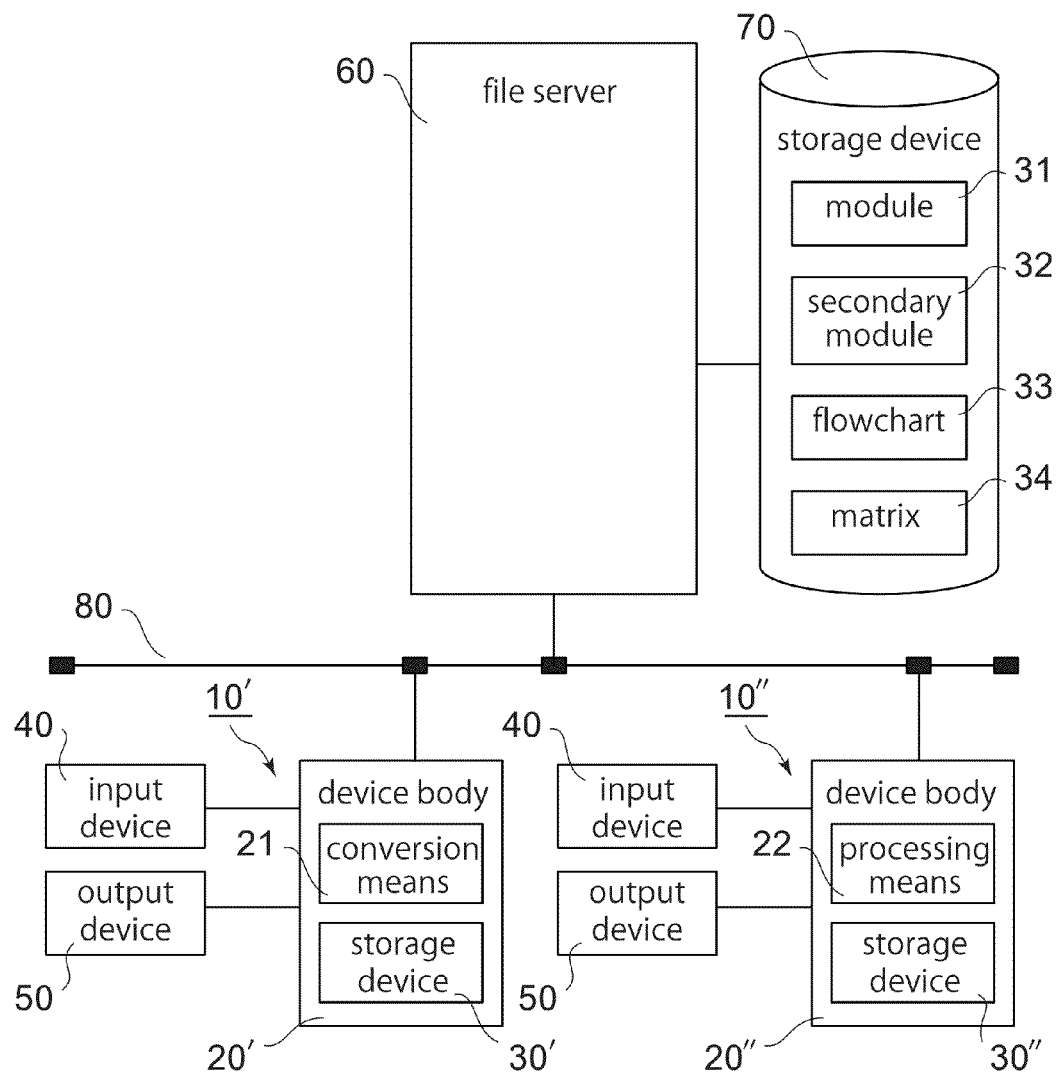
FIG. 20 is a block diagram showing a modification of the device of FIG. 1.

The device 10 according to the present embodiment can be modified variously. For example, as shown in FIG. 20, the device 10 can be divided to include a device 10' comprising the conversion means 21, the device 10" comprising the processing means 22 and a device (not shown) comprising a selection means. Each of the device 10' and the device 10" is coupled to a file server 60 via a communication line 80 so as to be able to communicate with the file server 60. For example, the communication line 80 may be a local area network (LAN) or may be the Internet. The file server 60 comprises a storage device (storage means) 70. The storage device 70 can store the module 31, the secondary module 32, the flowchart 33 and the matrix 34. Accordingly, each of the device 10' and the device 10"can read the module 31 and so on from the storage device 70 and write the module 31 and so on into the storage device 70.

The device 10' comprises a device body 20', the input device 40 and the output device 50. The device 10 "comprises a device body 20", the input device 40 and the output device 50. The device body 20' includes the conversion means 21 and a storage device (storage means) 30'. The device body 20" includes the processing means 22 and a storage device (storage means) 30".

Each of the storage device 30' and the storage device 30" according to the present embodiment can be formed of a primary storage device. For example, the conversion means 21 can read the module 31 from the storage device 30'. In other words, the storage means of the present modification is mainly the primary storage device.

The present application is based on a Japanese patent application of JP2011-162519 filed before the Japan Patent Office on Jul. 25, 2011, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 10, 10', 10" device (module structural analysis supporting device)
20, 20', 20" device body
21 conversion means
22 processing means
23 selection means
24 display attribute setting means
25 flowchart creation means
26 matrix creation means
30, 30', 30" storage device (storage means)
31 module (source program)
310 line
311 sequence number (line ID)
312 sentence
32 secondary module (secondary source program)
320 secondary line
321 module ID
322 line number
323 hierarchy ID
324 operation ID
325 operand information
325$f$ first operand (operand)
325$o$ operator
325$s$ second operand (operand)
326 sequence number (line ID)
327 secondary sentence
328 display attribute
33 flowchart
34 matrix
40 input device
50 output device
60 file server
70 storage device (storage means)
80 communication line

The invention claimed is:

1. A device configured to convert a module into a secondary module to support structural analysis of the module, the module including one or more sentences written in a program language, the secondary module including one or more secondary sentences, wherein:

the module is identifiable by a module name, the module being able to include one or more processing sections described therein, the processing section including one or more of the sentences, the processing section being identifiable by a processing section name;

the module is able to include a processing-section perform statement, a module call statement and a conditional statement described therein as the sentence, the processing-section perform statement being the sentence that identifies and performs the processing-section by using the processing section name, the module call statement being the sentence that identifies and performs the module by using the module name, the conditional statement being the sentence that selects the sentence to be executed by determining whether a conditional expression is satisfied or not, the conditional statement being able to include the other conditional statement described therein as the sentence to be selected by the conditional statement so that the sentences being formable hierarchies by using the conditional statements;

the device comprises:

a storage device which stores one or more of the modules; and a processor which is configured to convert a predetermined target module of the modules stored in the storage device into the secondary module to store the secondary module in the storage device, the processor being configured to have a read function, a conversion function and a write function;

the read function is a function to read the target module from the storage device;

the conversion function is a function that sequentially outputs each of the sentences described between a predetermined process start location and a predetermined process end location of the target module into the secondary module as the secondary sentence, and that generates one or more of the secondary sentences from an expansion and outputs the generated secondary sentences into the secondary module when the sentence to be output into the secondary module is the processing-section perform statement or the module call statement, the expansion being the sentences described in the processing section to be performed or in the module to be called, the expansion being further provided about the processing-section perform statement or the module call statement in the sentences of the expansion; and the write function is a function to store the secondary module into the storage device.

2. The device as recited in claim 1, wherein:

the processor is configured to have a control information getting function, the control information getting function being a function to get an expansion control information, the expansion control information optionally including an expansion limit indicator, the expansion limit indicator indicating that the expansion of the sentences described in each of the processing section to be performed and the module to be called is provided only once; and when the expansion limit indicator is included in the expansion control information, the conversion function provides the expansion of the sentences described in the processing section to be performed only once at first time with respect to the same processing section, and provides the expansion of the sentences described in the module to be called only once at first time with respect to the same module.

3. The device as recited in claim 1, wherein:

when the sentence is the conditional statement, the conversion function generates one or more secondary conditional statements, each of which is a kind of the secondary sentence, based on the conditional expression of the conditional statement, and forms one or more hierarchies of the secondary sentences by using the secondary conditional statements to output into the secondary module; and the secondary conditional statement is the secondary sentence that selects the secondary sentence to be executed by determining whether a secondary conditional expression is satisfied or not, the secondary conditional expression evaluating a relation between two operands to be evaluated by only one operator.

4. The device as recited in claim 3, wherein:

the processor is configured to have at least one of a hierarchy ID adding function and an operand adding function;

the hierarchy ID adding function is a function to add a hierarchy ID to at least one of the secondary sentences which is to be output into the secondary module, the hierarchy ID indicating the hierarchy where the secondary sentence belongs; and the operand adding function is a function to add an operand information to specific one or more of the secondary sentences which are to be output into the secondary module, each of the specific one or more of the secondary sentences including two operands each formed of a constant or a variable and one operator, the operand information including the two operands and the one operator.

5. The device as recited in claim 4, wherein:

the storage device stores the secondary module including the secondary sentence into which at least the hierarchy ID is added;

the processor is configured to select one or more of the secondary sentences of the secondary module stored in the storage device, the processor being configured to have a read function, a specific information getting function, a selecting function and a write function;

the read function is a function to read the secondary module from the storage device;

the specific information getting function is a function to get a hierarchy ID specific information, the hierarchy ID specific information specifying the hierarchy ID of the secondary sentence that is to be selected;

the selecting function is a function to select the secondary sentence that has the hierarchy ID same as the hierarchy ID specified by the hierarchy ID specific information from the secondary sentences of the secondary module to output the selected secondary sentence into the secondary module after selection; and the write function is a function to store the secondary module after selection into the storage device.

6. The device as recited in claim 4, wherein:

the storage device stores the secondary module including the secondary sentence into which at least the hierarchy ID is added;

the processor is configured to create a table-form flowchart from the secondary module stored in the storage device, the processor being configured to have a read function, a flowchart creation function and a write function;

the read function is a function to read the secondary module from the storage device;

the flowchart creation function is a function to create the flowchart of the secondary sentences of the secondary module, the secondary sentences that belong to the hierarchy same as one another are arranged in the flowchart so that the secondary sentence to be executed when the secondary conditional expression is satisfied and the secondary sentence to be executed when the secondary conditional expression is not satisfied are placed at left and right sides of a table, each of the hierarchies of the secondary sentences being specified by the hierarchy ID; and the write function is a function to store the flowchart into the storage device.

7. The device as recited in claim 4, wherein:

the storage device stores the secondary module including the secondary sentence into which at least the operand information is added;

the processor is configured to set a predetermined display attribute to the secondary sentence of the secondary module stored in the storage device, the processor being configured to have a read function, an initial search string getting function, a display attribute setting function and a write function;

the read function is a function to read the secondary module from the storage device;

the initial search string getting function is a function to get an initial search string;

the display attribute setting function is a function that gets the operand including the initial search string from the operands of the operand informations of the secondary sentences of the secondary module as an additional search string, that further gets the operand including the additional search string from the operands of the operand informations of the secondary sentences as the additional search string, and that sets the predetermined display attribute with respect to specified one or more of the secondary sentences, the operand of the operand information of each of the specified one or more of the secondary sentences including the initial search string or the additional search string; and the write function is a function to store the secondary module, which includes the secondary sentence to which the predetermined display attribute is set, into the storage device.

8. The device as recited in claim 3, wherein:

the storage device stores the secondary module;

the processor is configured to create a table-form matrix which is formed of a plurality of columns and one or more rows from the secondary module stored in the storage device, the processor being configured to have a read function, a secondary sentence output function, a case generation function, a matrix creation function and a write function;

the read function is a function to read the secondary module from the storage device;

the secondary sentence output function is a function to output the secondary sentences of the secondary module into the respective rows of a predetermined one of the columns of the matrix;

the case generation function is a function to use one or more of the secondary conditional expressions of the secondary module to generate cases, the cases including each of a case where all of the one or more of the secondary conditional expressions are satisfied, another case where a part of the one or more of the secondary conditional expressions are satisfied and still another case where all of the one or more of the secondary conditional expressions are not satisfied;

the matrix creation function is a function to map some of the columns to the generated cases as relation indicating columns, respectively, and to output an indicator into the row where the secondary sentence, which is to be executed under the case corresponding to the relation indicating column, is output, the indicator indicating that the secondary sentence output into the row is to be executed; and the write function is a function to store the matrix into the storage device.

9. The device as recited in claim 8, wherein the matrix creation function selects one or more of the secondary sentences of the secondary module stored in the storage device to extract, as the target to be stored, only the relation indicating column that corresponds to the case where the selected secondary sentence is to be executed.

10. A device configured to convert a module into a secondary module to support structural analysis of the module, the module including one or more sentences written in a program language, the secondary module including one or more secondary sentences, the module being identifiable by a module name, the module being able to include one or more processing sections, the processing section including one or more of the sentences, the processing section being identifiable by a processing section name, the module being able to includes each of a processing-section perform statement, a module call statement and a conditional statement as the sentence, the processing-section perform statement being the sentence that identifies and performs the processing-section by using the processing section name, the module call statement being the sentence that identifies and performs the module by using the module name, the conditional statement being the sentence that selects the sentence to be executed by determining whether a conditional expression is satisfied or not, the conditional statement being able to includes the other conditional statement as the sentence to be selected by the conditional statement so that the sentences being formable hierarchies by using the conditional statements, the device comprising:

a storage device which stores one or more of the modules; and a device body which comprises a processor and is coupled to the storage device, the device body reading one of the modules as a target module from the storage device, the device body sequentially outputting each of the sentences located between a predetermined process start point and a predetermined process end point of the target module into the secondary module as the secondary sentence, the device body generating one or more of the secondary sentences from an expansion and outputting the generated secondary sentences into the secondary module when the sentence to be output into the secondary module is the processing-section perform statement or the module call statement, the expansion being the sentences copied from the processing section to be performed or from the module to be called, the expansion being further provided about the processing-section perform statement or the module call statement in the sentences of the expansion, the device body writing the secondary module into the storage device.

11. A method performed by a computer system including a storage device storing one or more modules for converting the module into a secondary module to support structural analysis of the module, the module including one or more sentences written in a program language, the secondary module including one or more secondary sentences, the module being identifiable by a module name, the module being able to include one or more processing sections, the processing section including one or more of the sentences, the processing section being identifiable by a processing section name, the module being able to includes each of a processing-section perform statement, a module call statement and a conditional statement as the sentence, the processing-section perform statement being the sentence that identifies and performs the processing-section by using the processing section name, the module call statement being the sentence that identifies and performs the module by using the module name, the conditional statement being the sentence that selects the sentence to be executed by determining whether a conditional expression is satisfied or not, the conditional statement being able to includes the other conditional statement as the sentence to be selected by the conditional statement so that the sentences being formable hierarchies by using the conditional statements, the method comprising:

reading one of the modules as a target module from the storage device;

sequentially outputting each of the sentences located between a predetermined process start point and a predetermined process end point of the target module into the secondary module as the secondary sentence;

generating one or more of the secondary sentences from an expansion and outputting the generated secondary sentences into the secondary module when the sentence to be output into the secondary module is the processing-section perform statement or the module call statement, the expansion being the sentences copied from the processing section to be performed or from the module to be called, the expansion being further provided about the processing-section perform statement or the module call statement in the sentences of the expansion; and writing the secondary module into the storage device.

12. A non-transitory computer readable recording medium storing instructions executable by a processor of a computer system, the computer system including a storage device storing one or more modules for converting the module into a secondary module to support structural analysis of the module, the module including one or more sentences written in a program language, the secondary module including one or more secondary sentences, the module being identifiable by a module name, the module being able to include one or more processing sections, the processing section including one or more of the sentences, the processing section being identifiable by a processing section name, the module being able to includes each of a processing-section perform statement, a module call statement and a conditional statement as the sentence, the processing-section perform statement being the sentence that identifies and performs the processing-section by using the processing section name, the module call statement being the sentence that identifies and performs the module by using the module name, the conditional statement being the sentence that selects the sentence to be executed by determining whether a conditional expression is satisfied or not, the conditional statement being able to includes the other conditional statement as the sentence to be selected by the conditional statement so that the sentences being formable hierarchies by using the conditional statements, the instructions comprising instructions for:

reading one of the modules as a target module from the storage device;

sequentially outputting each of the sentences located between a predetermined process start point and a predetermined process end point of the target module into the secondary module as the secondary sentence;

generating one or more of the secondary sentences from an expansion and outputting the generated secondary sentences into the secondary module when the sentence to be output into the secondary module is the processing-section perform statement or the module call statement, the expansion being the sentences copied from the processing section to be performed or from the module to be called, the expansion being further provided about the processing-section perform statement or the module call statement in the sentences of the expansion; and writing the secondary module into the storage device.

* * * * *